United States Patent
Spae

(10) Patent No.: US 11,850,762 B1
(45) Date of Patent: Dec. 26, 2023

(54) CUTTING DEVICE WITH ADDITIONAL ELEMENTS

(71) Applicant: Johnathan T. Spae, Austin, TX (US)

(72) Inventor: Johnathan T. Spae, Austin, TX (US)

( * ) Notice: Subject to any disclaimer, the term of this patent is extended or adjusted under 35 U.S.C. 154(b) by 183 days.

(21) Appl. No.: 17/361,557

(22) Filed: Jun. 29, 2021

Related U.S. Application Data

(63) Continuation-in-part of application No. 15/975,770, filed on May 10, 2018, now Pat. No. 11,059,192.

(60) Provisional application No. 62/504,526, filed on May 10, 2017.

(51) Int. Cl.
*B26B 11/00* (2006.01)
*A47J 43/25* (2006.01)
*B26B 29/02* (2006.01)
*B26B 3/03* (2006.01)

(52) U.S. Cl.
CPC ............. *B26B 11/006* (2013.01); *A47J 43/25* (2013.01); *B26B 3/03* (2013.01); *B26B 29/025* (2013.01)

(58) Field of Classification Search
CPC ....... B26B 11/006; B26B 3/03; B26B 29/025; A47J 43/25
USPC ............................................................ 7/113
See application file for complete search history.

(56) References Cited

U.S. PATENT DOCUMENTS

| | | | | |
|---|---|---|---|---|
| 1,178,533 A | * | 4/1916 | Mitchell | B26B 3/00 30/346 |
| 2,517,649 A | * | 8/1950 | Frechtmann | B23Q 13/00 30/151 |
| 4,097,951 A | * | 7/1978 | Hurtt | B05C 17/10 15/245.1 |
| 4,574,479 A | * | 3/1986 | Gramann | B26B 3/00 7/113 |
| 6,493,946 B1 | * | 12/2002 | Carrillo | B26B 29/02 30/296.1 |
| D736,576 S | * | 8/2015 | Parr | D7/693 |
| 9,434,082 B2 | * | 9/2016 | Spae | B26B 3/04 |
| 10,369,710 B2 | * | 8/2019 | Myvett | B26B 11/006 |

* cited by examiner

*Primary Examiner* — Hadi Shakeri
(74) *Attorney, Agent, or Firm* — Rick B. Yeager

(57) ABSTRACT

A food cutter apparatus with a blade portion and a handle portion. The blade portion is comprised of a single rigid material. The handle portion can be comprised of the same rigid material as the blade portion or a separate rigid material. The handle portion of the food cutter apparatus is located on top of the blade portion. A grater, slicer, or other kitchen tool elements are provided integral to the blade portion. A blade cover is provided to shield the user from the blade cutting edge while utilizing the kitchen tool elements. The handle portion and blade cover act as guides for the food product while utilizing the kitchen tool elements.

9 Claims, 69 Drawing Sheets

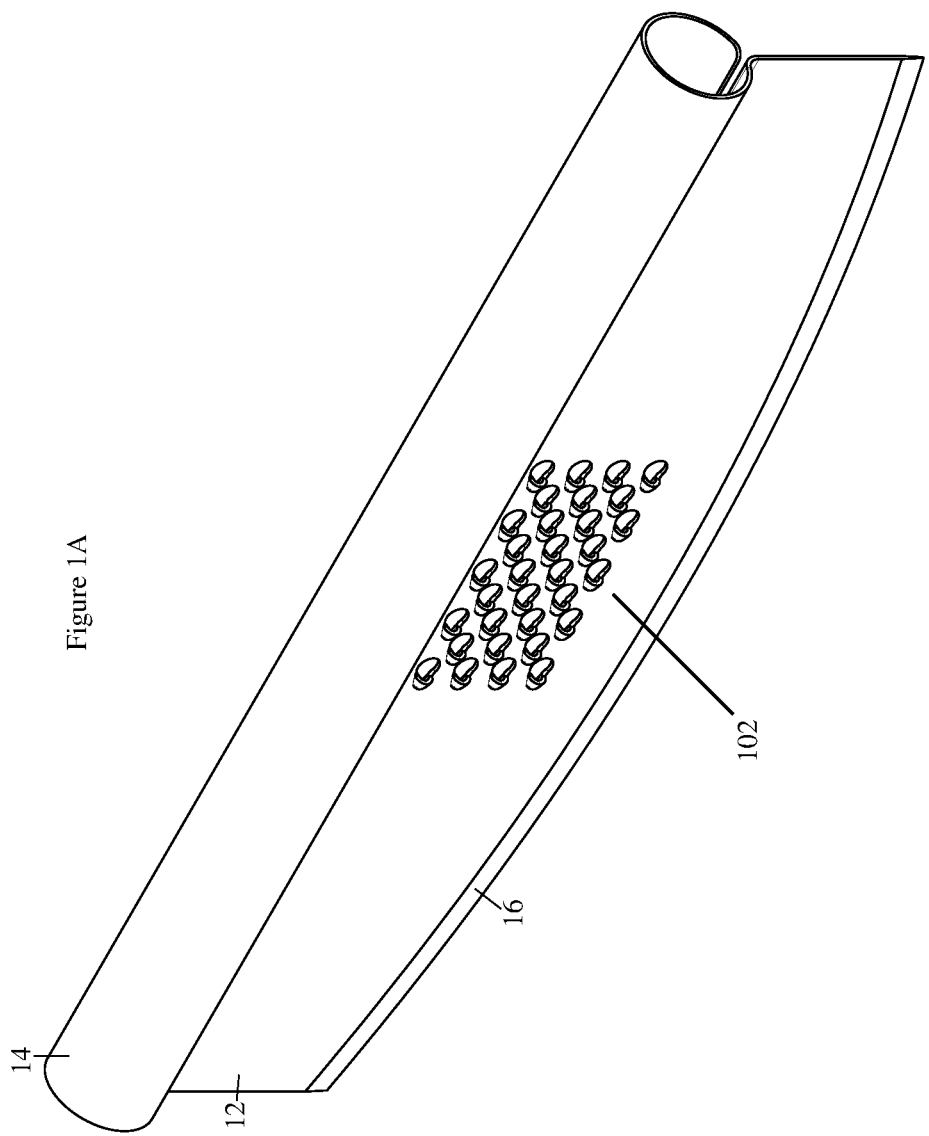

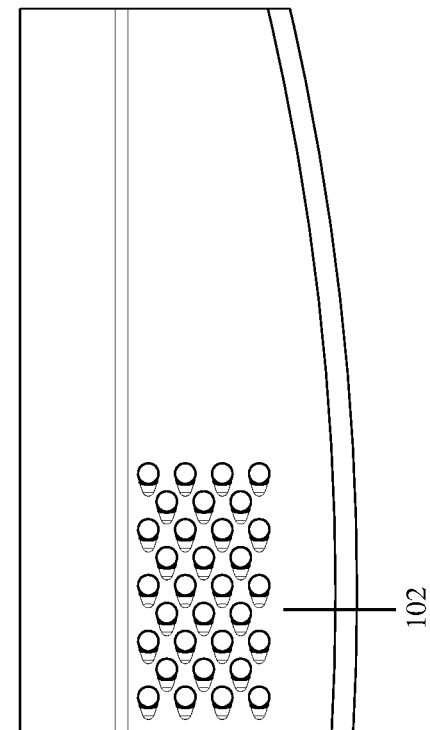
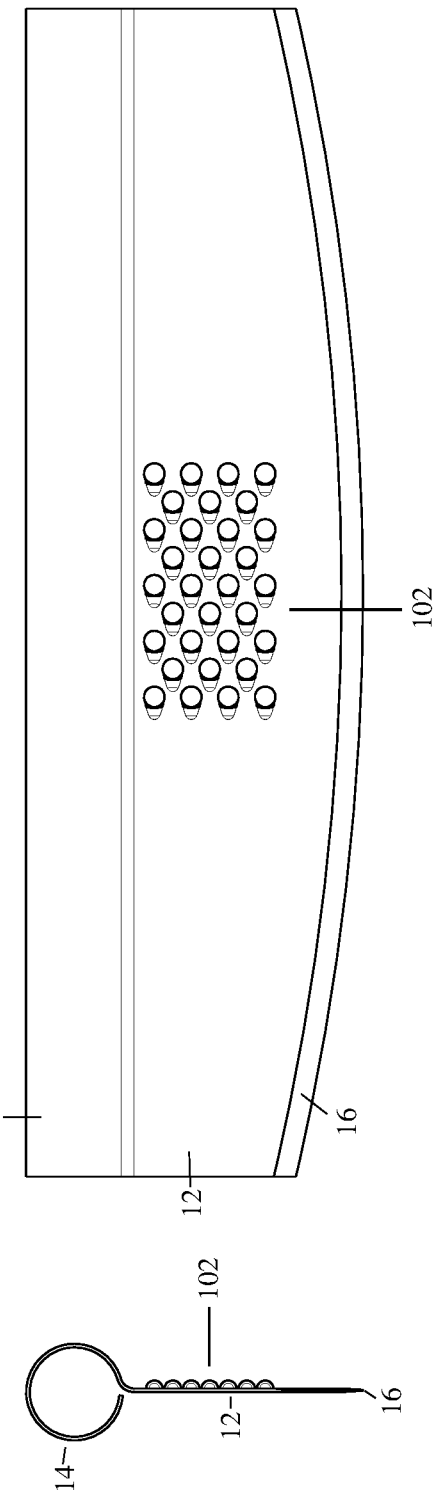
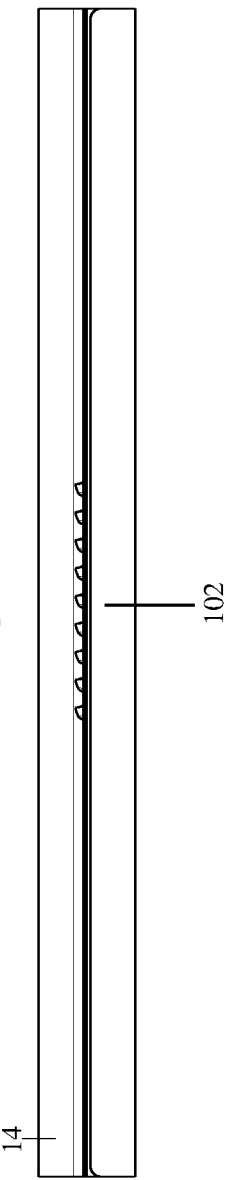

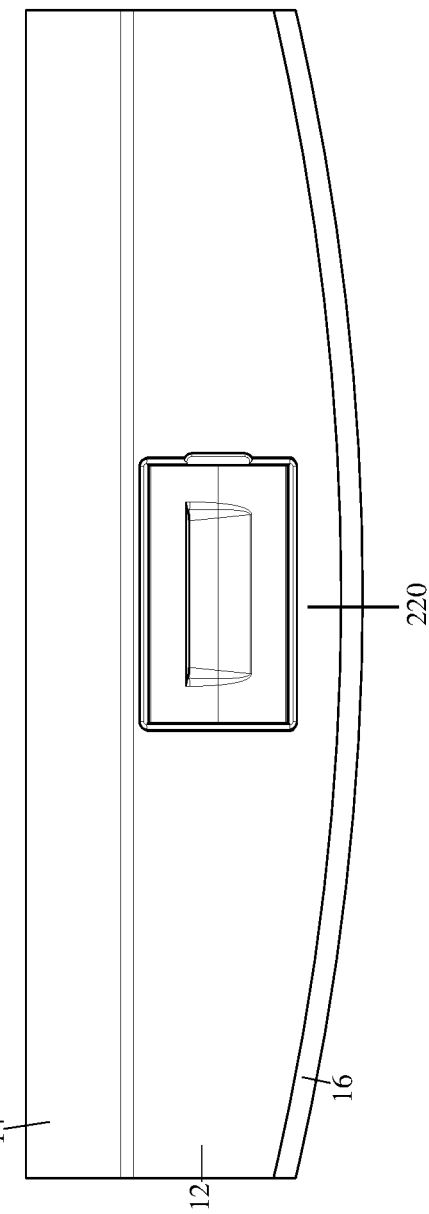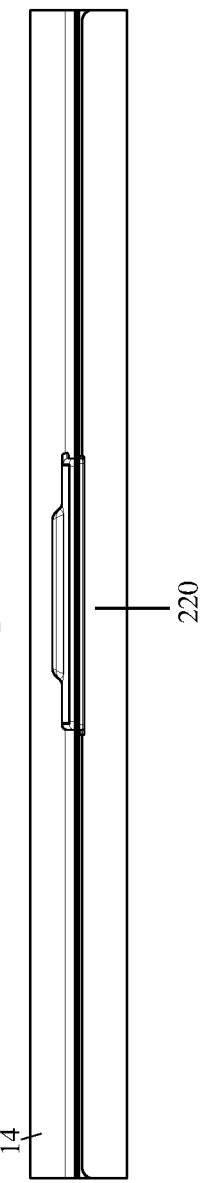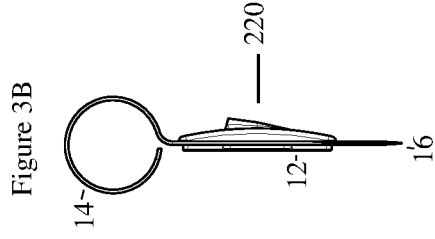

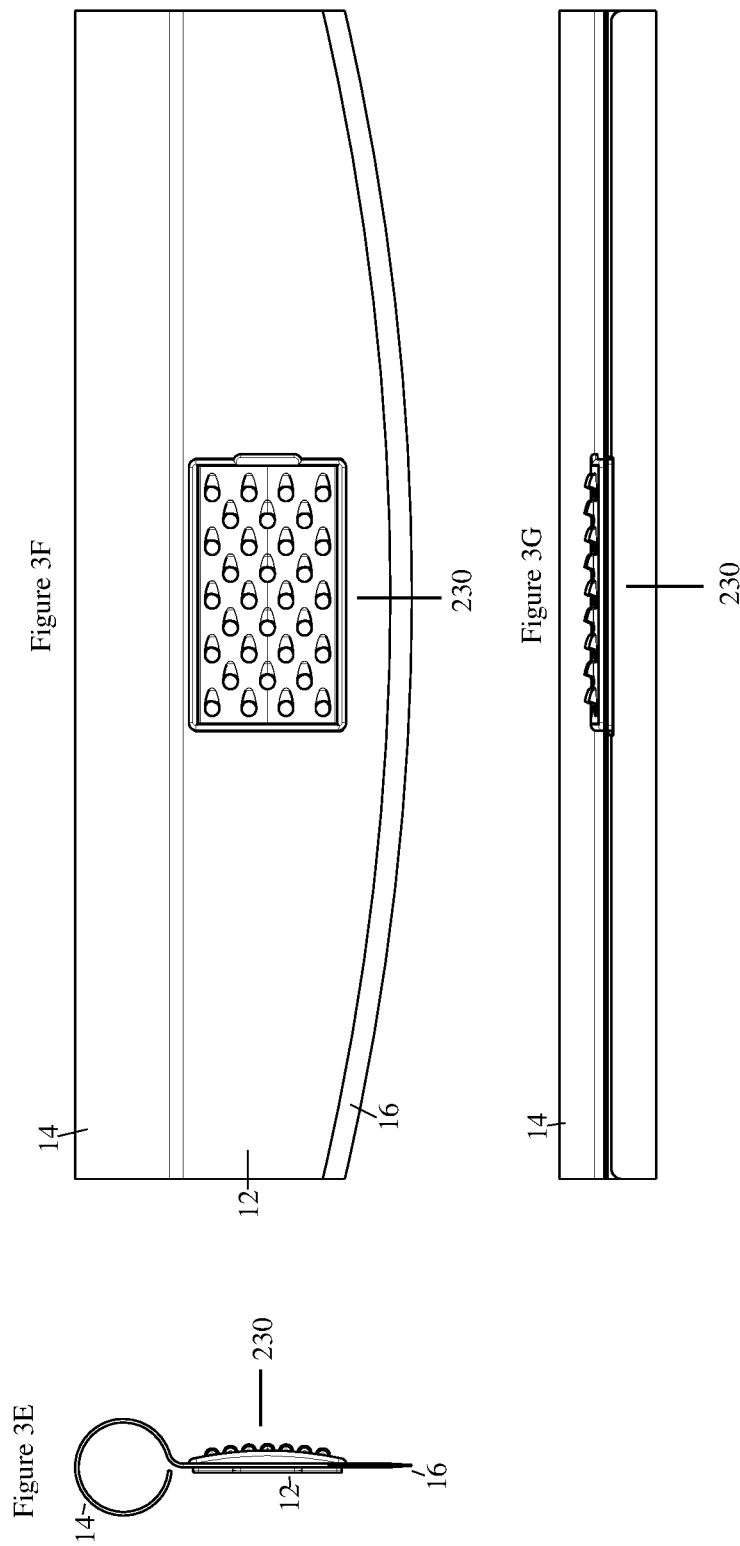

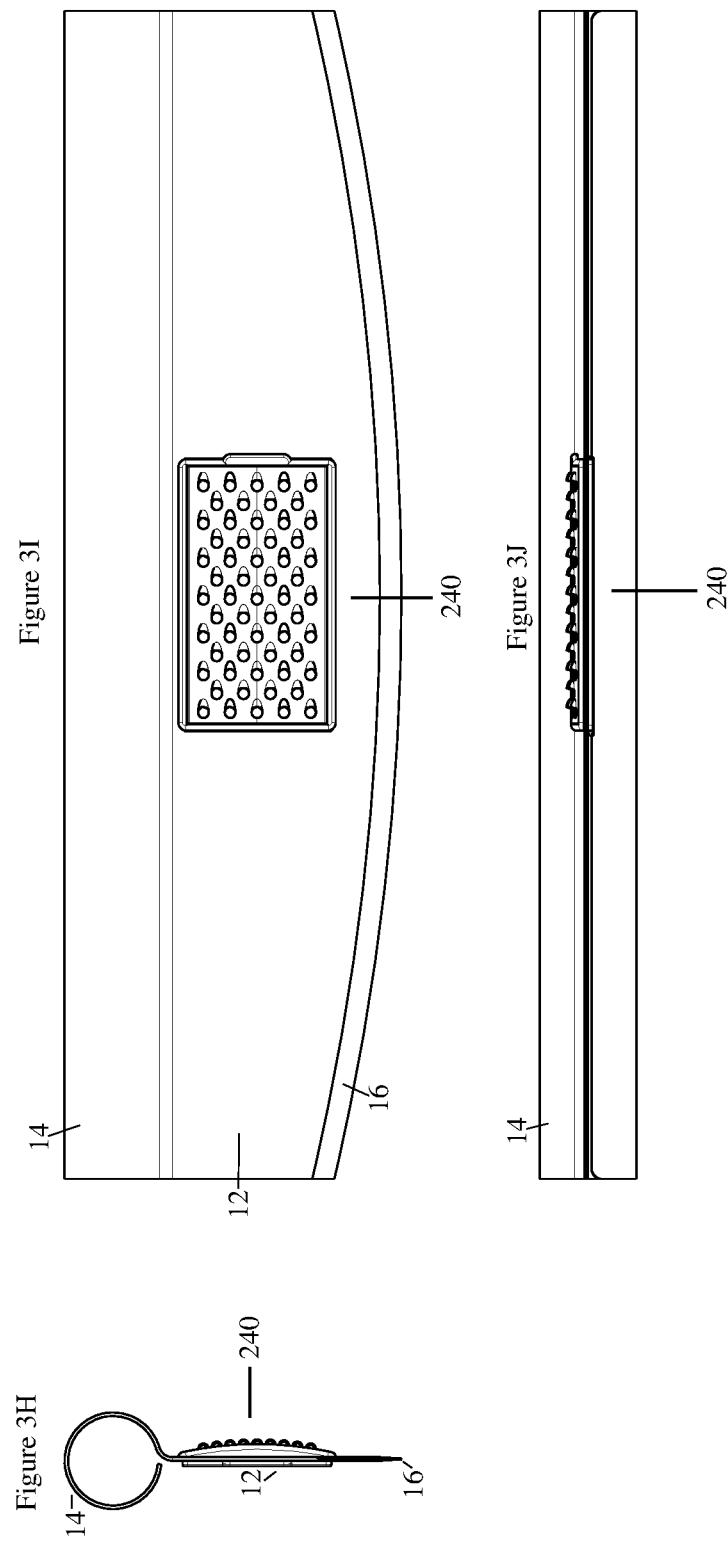

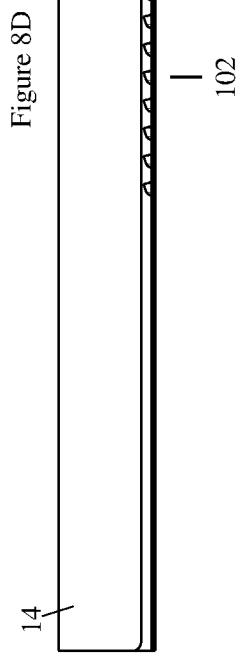
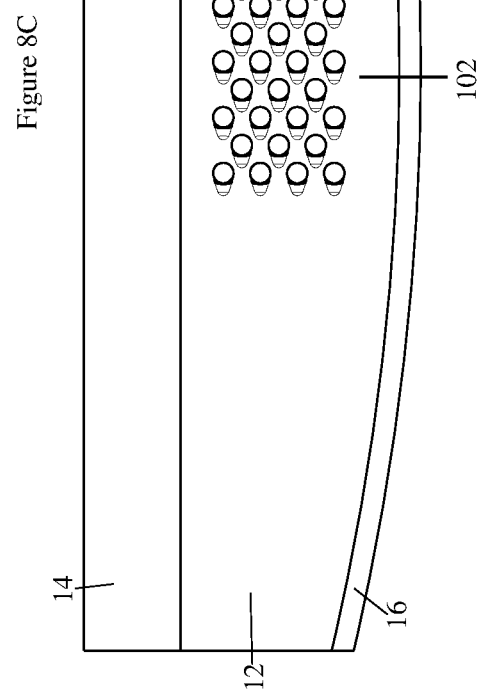
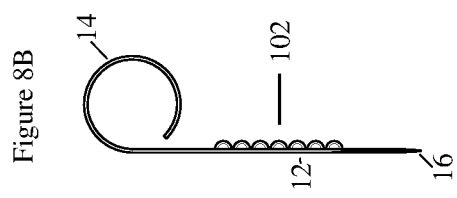

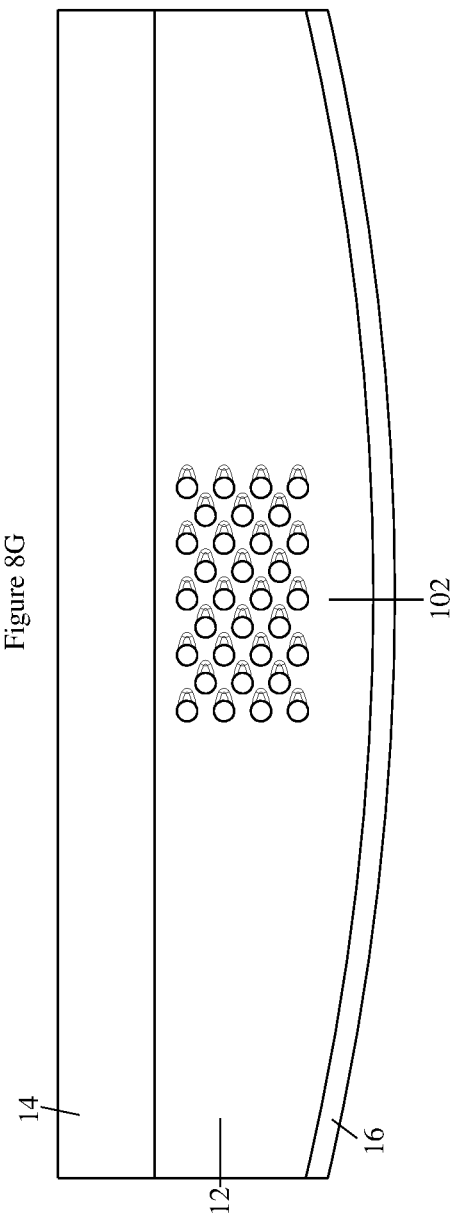
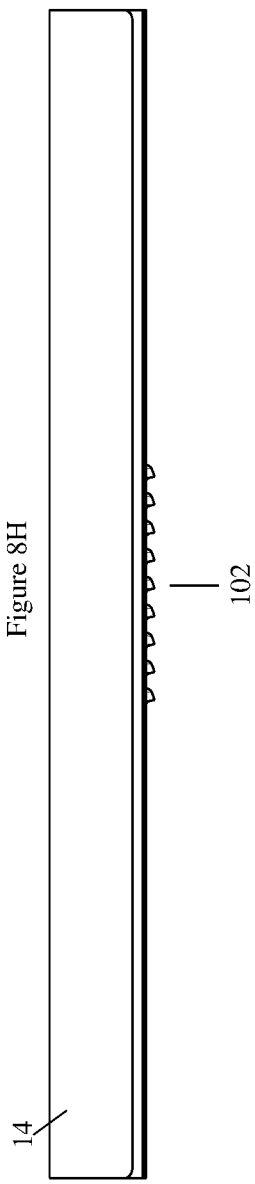
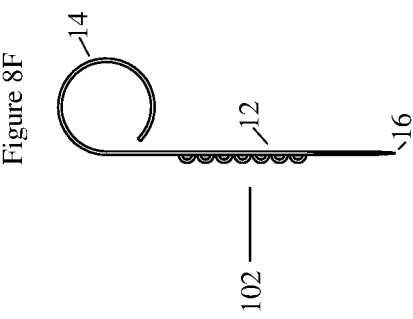

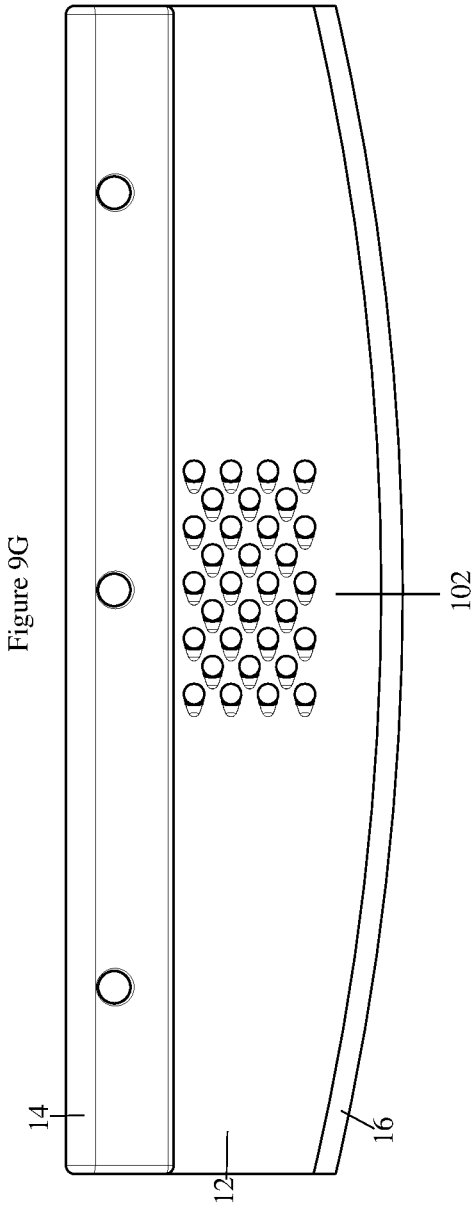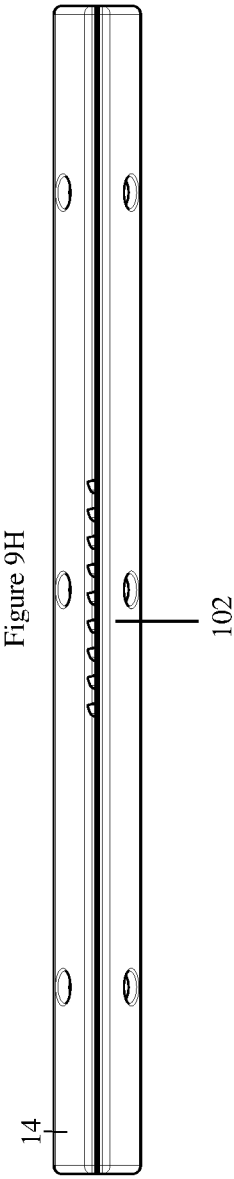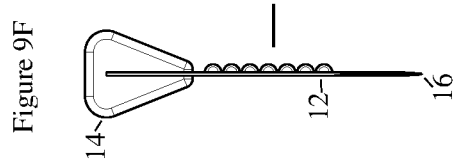

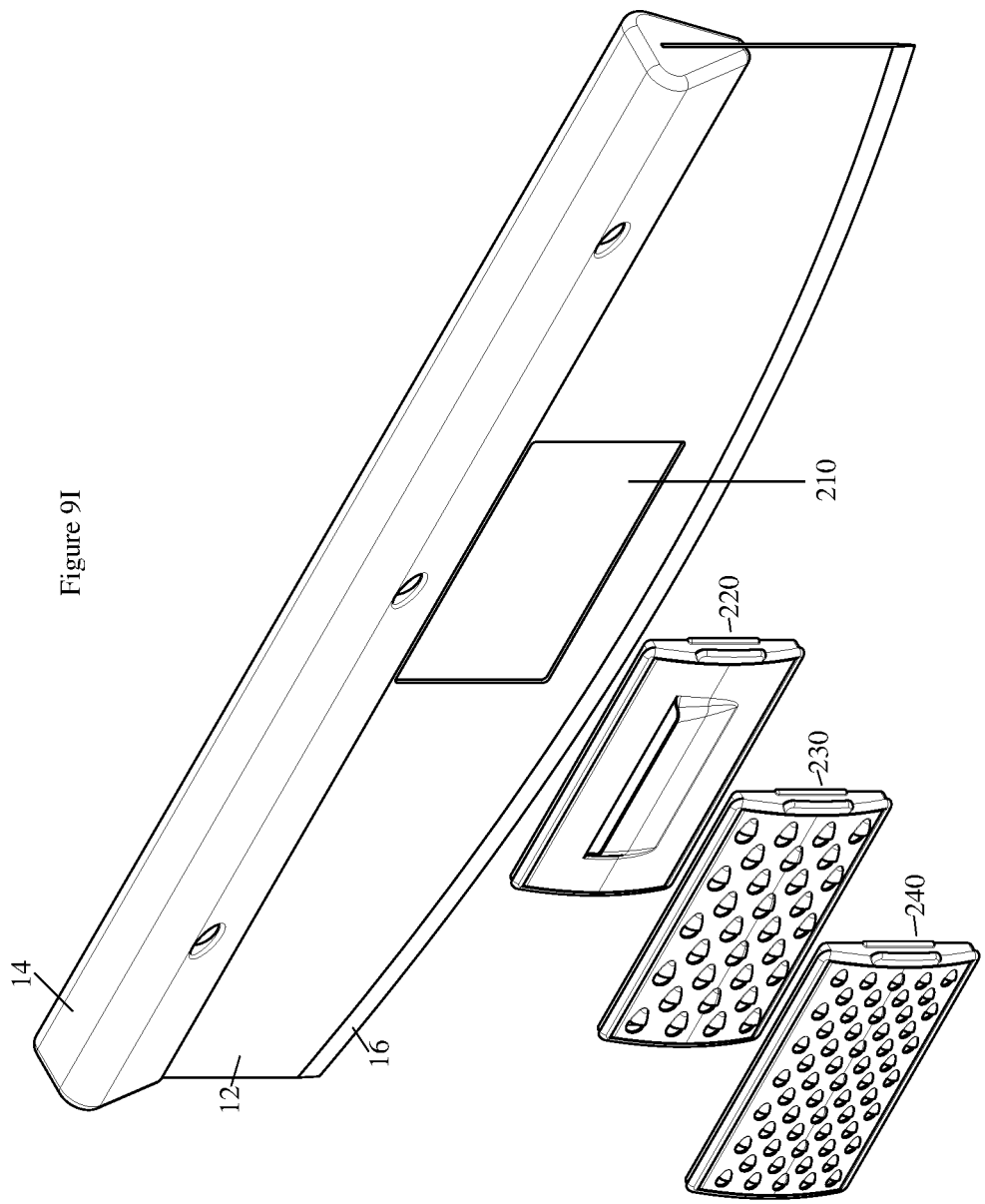

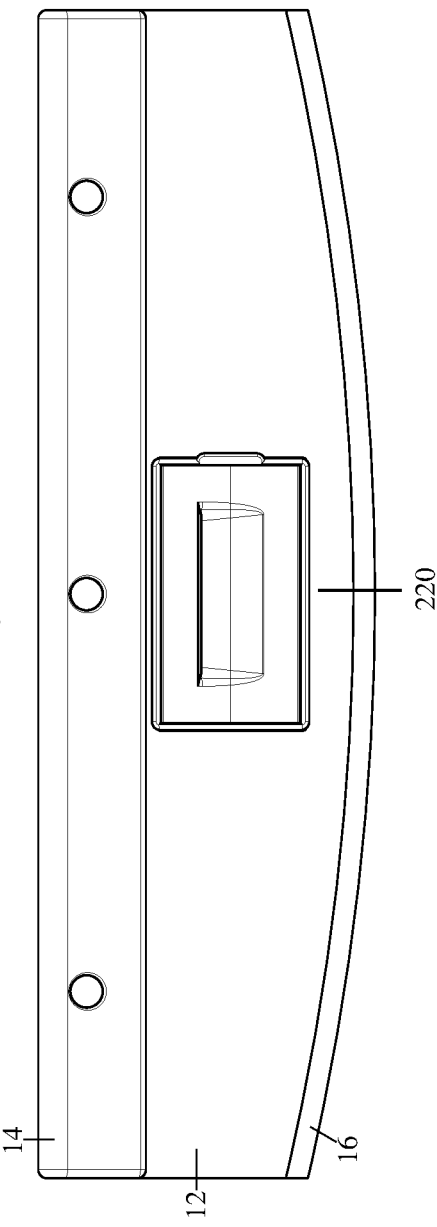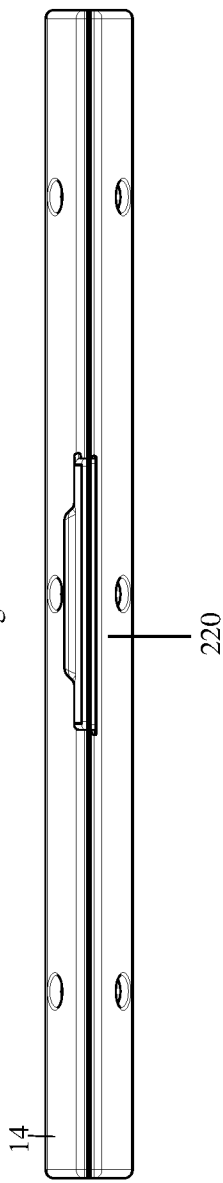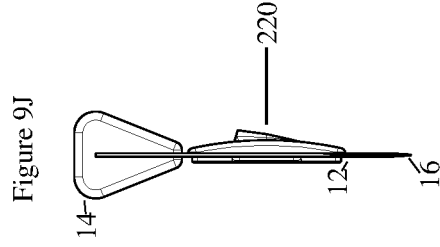

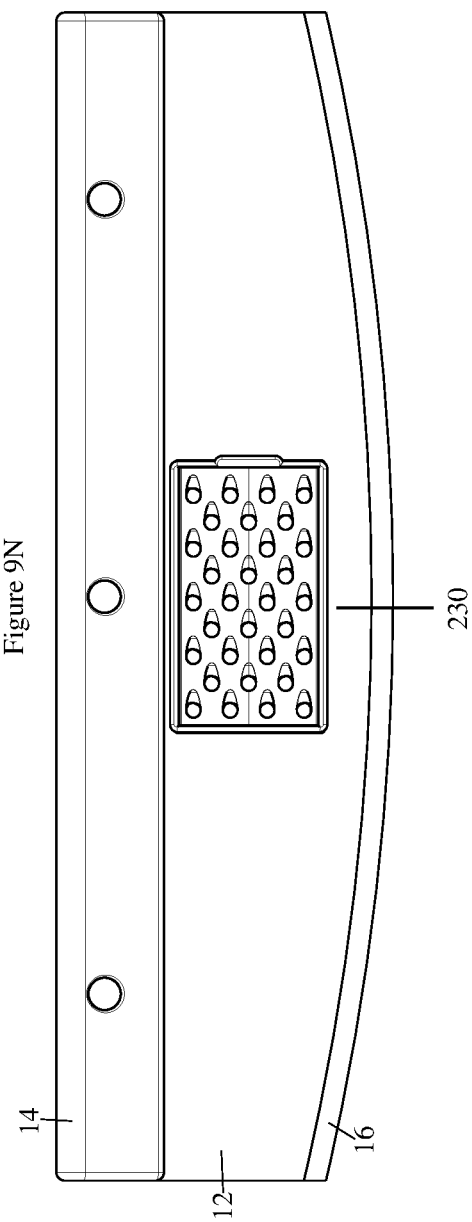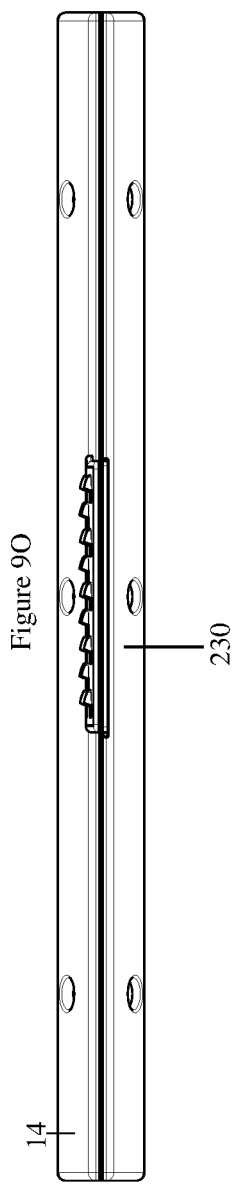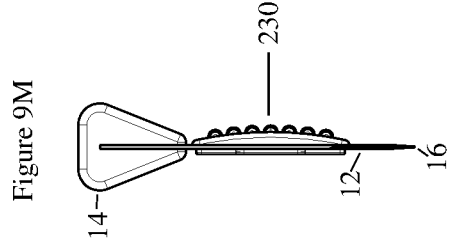

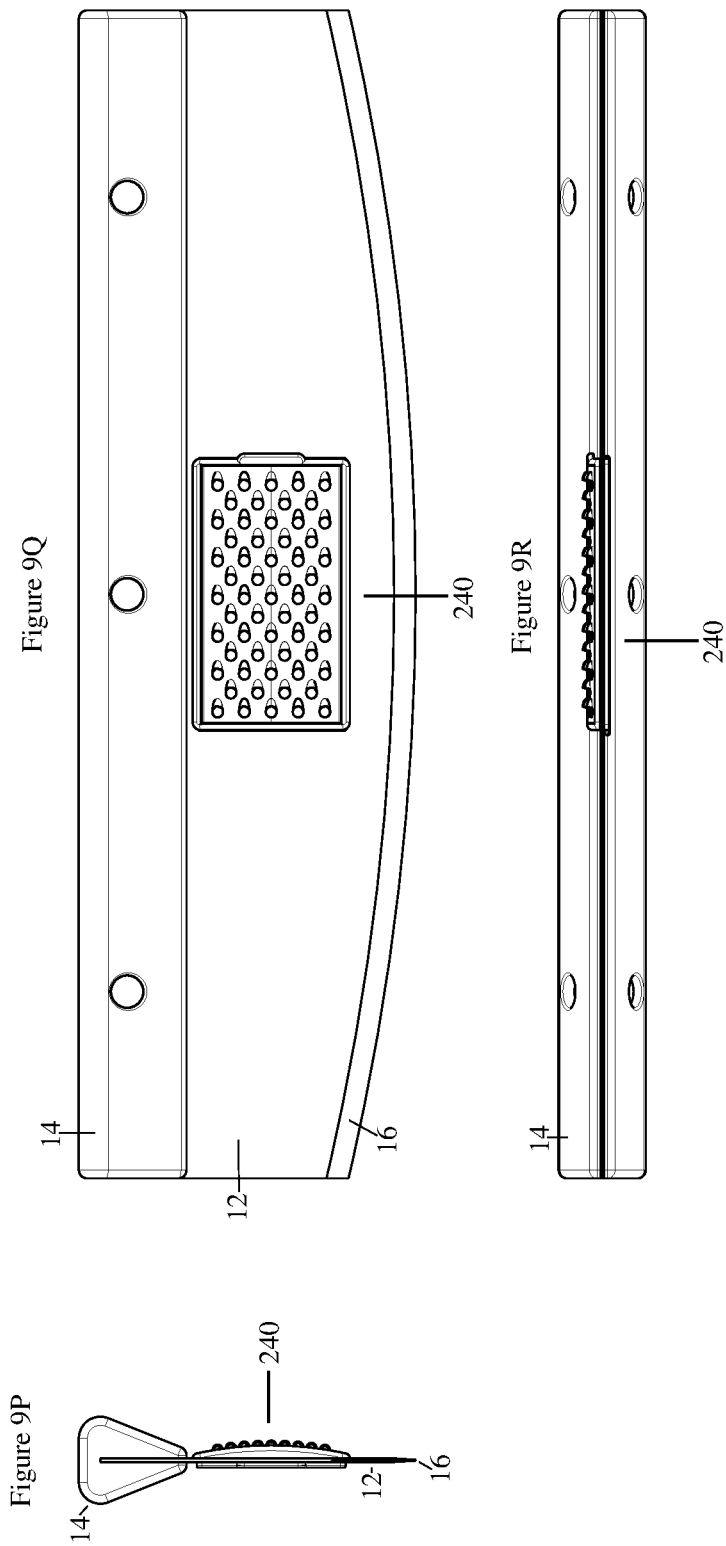

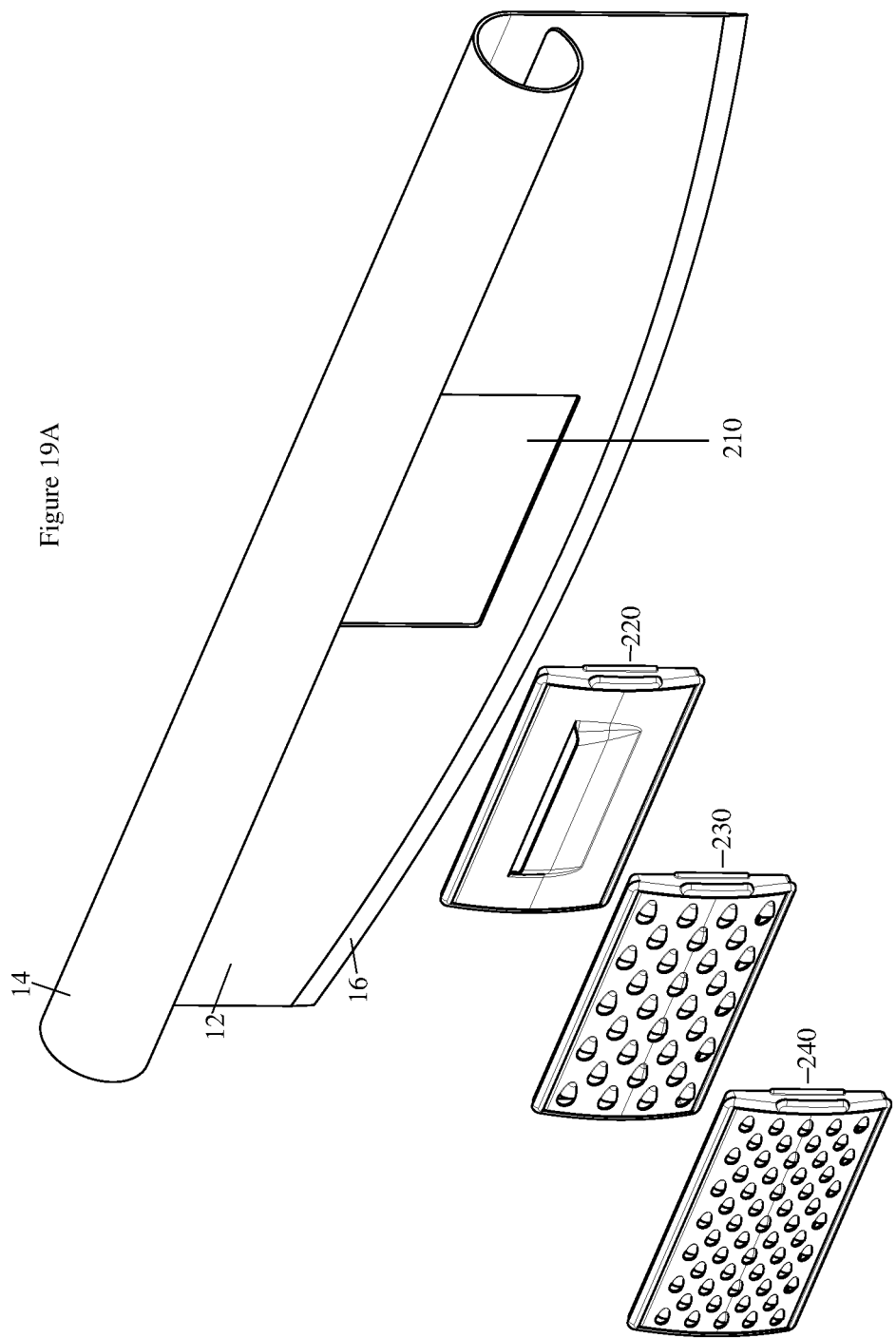

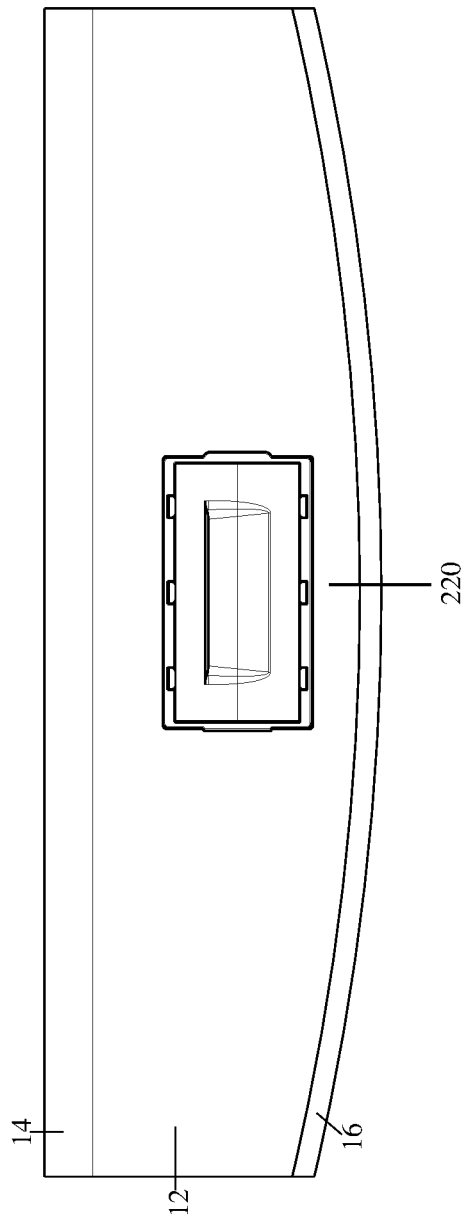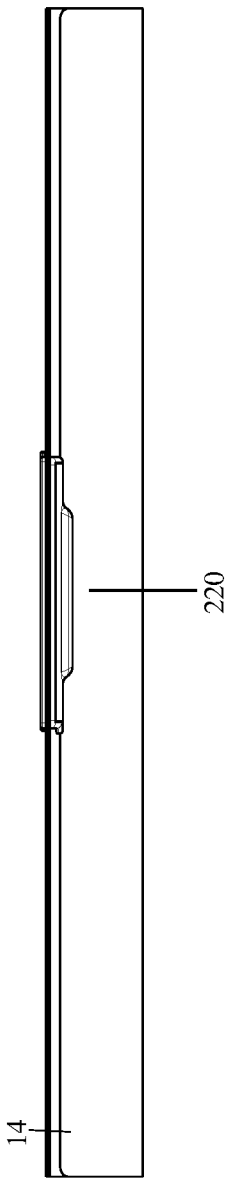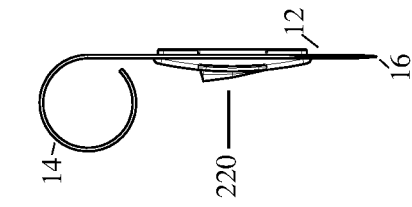

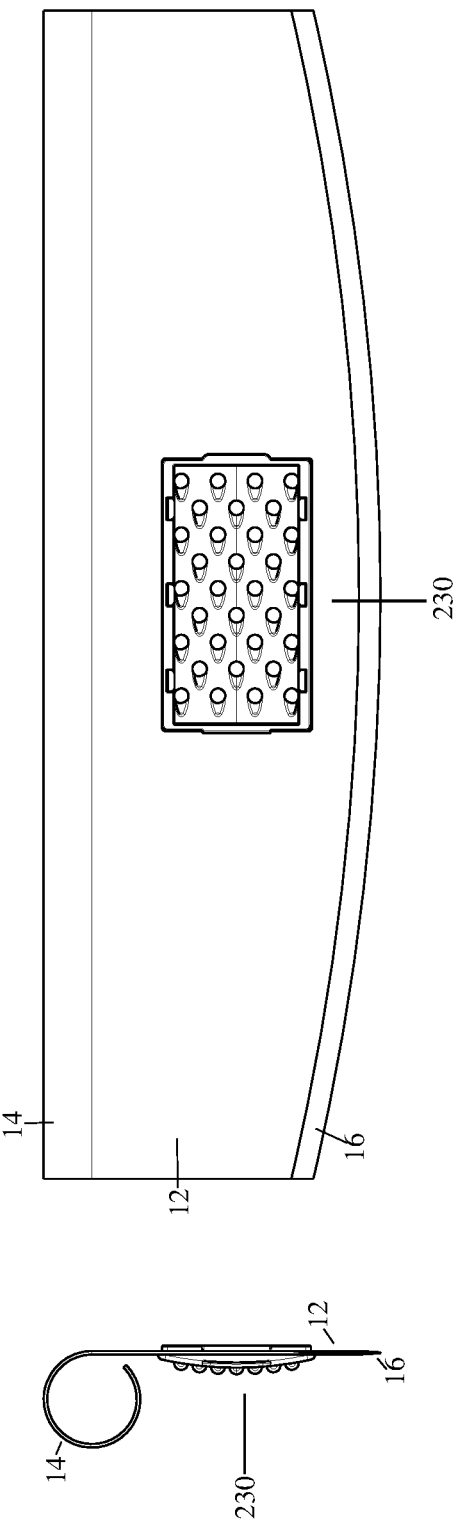
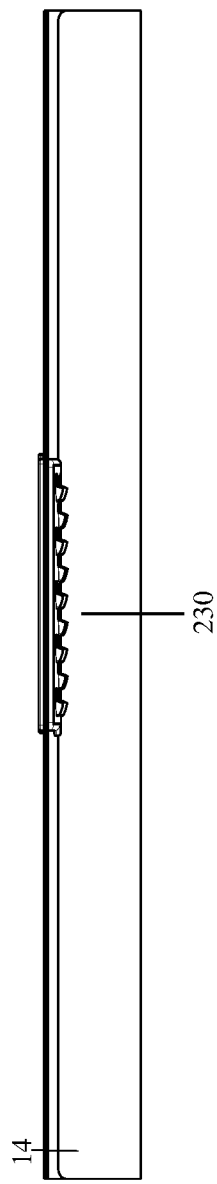

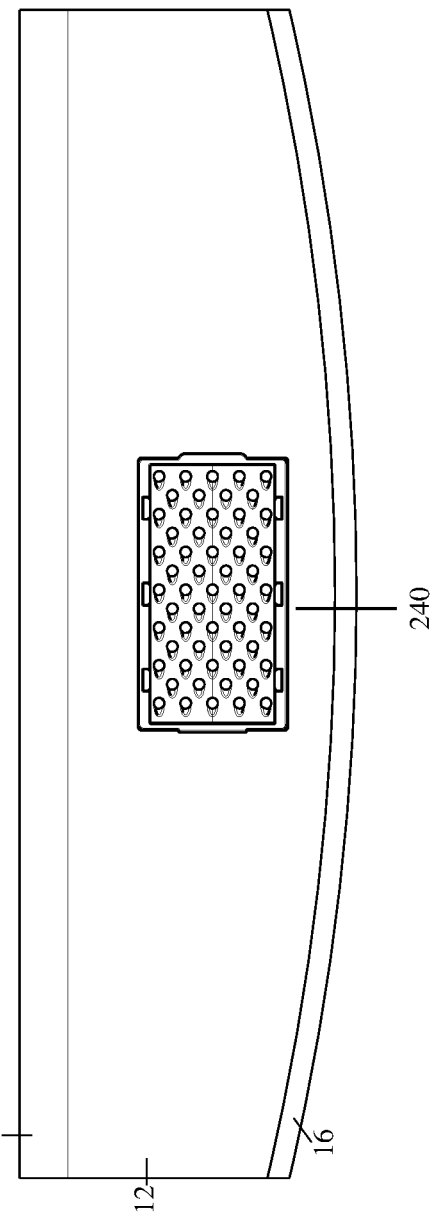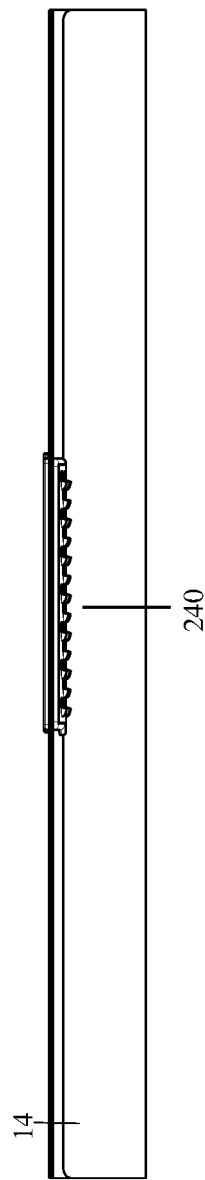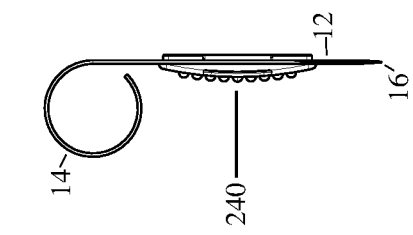

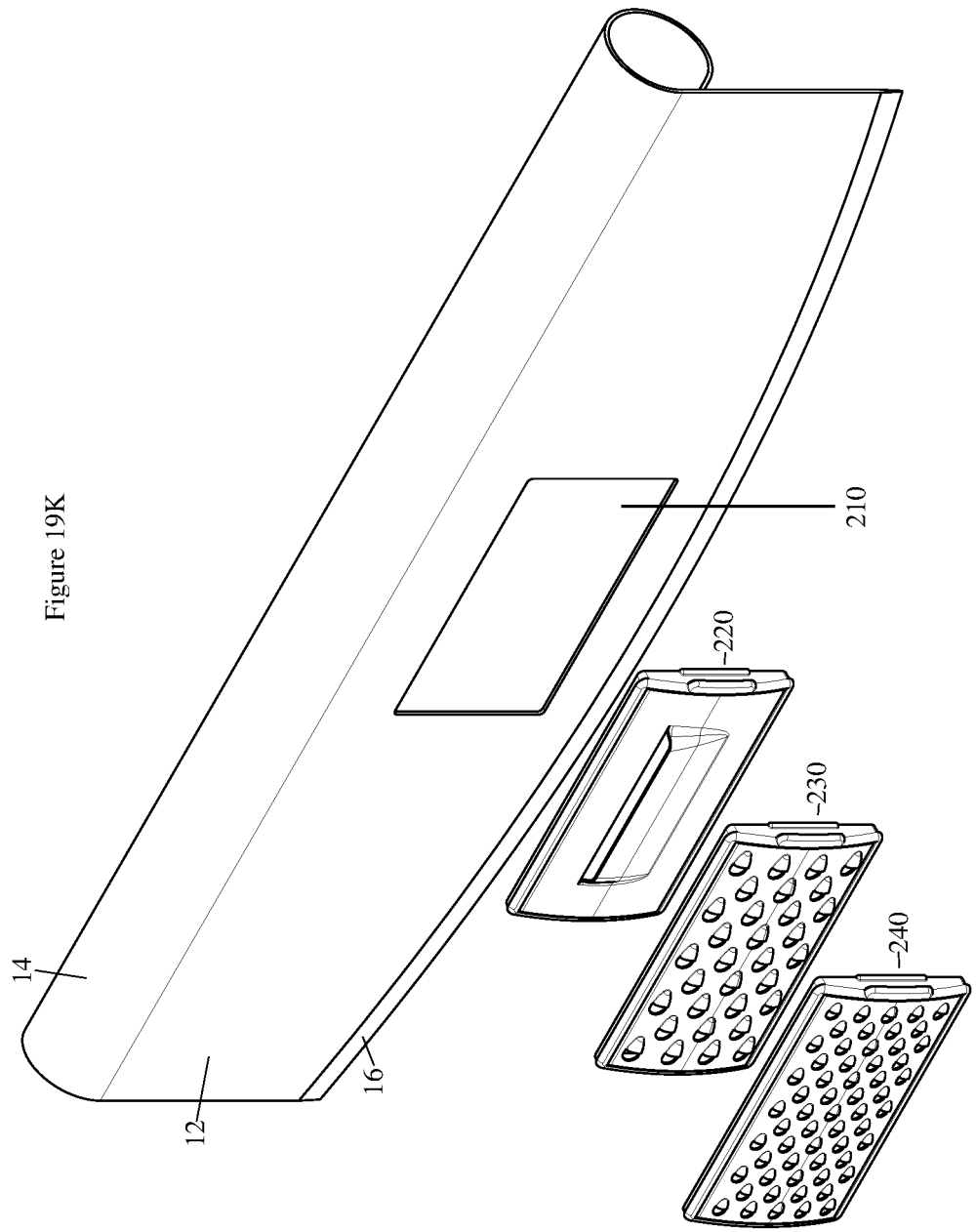

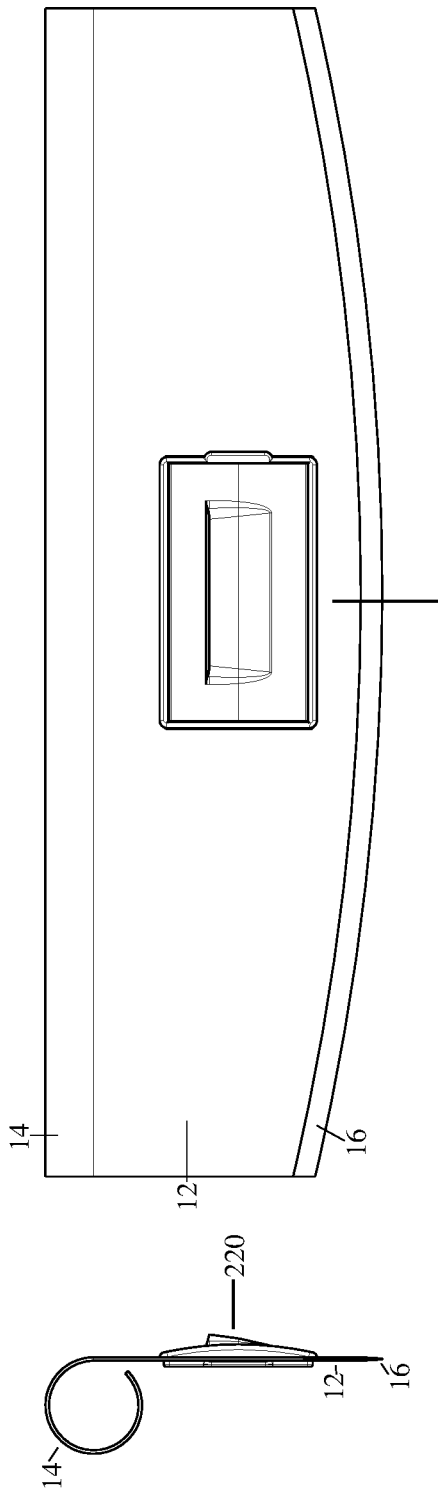
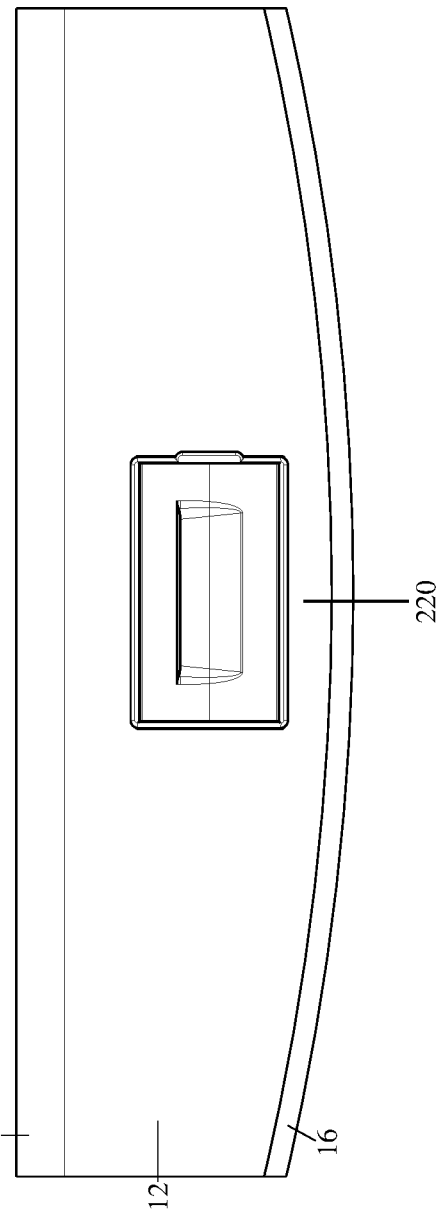
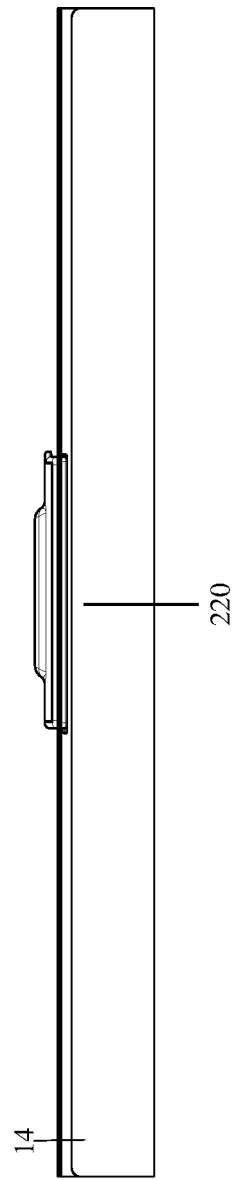
Figure 19L
Figure 19M
Figure 19N

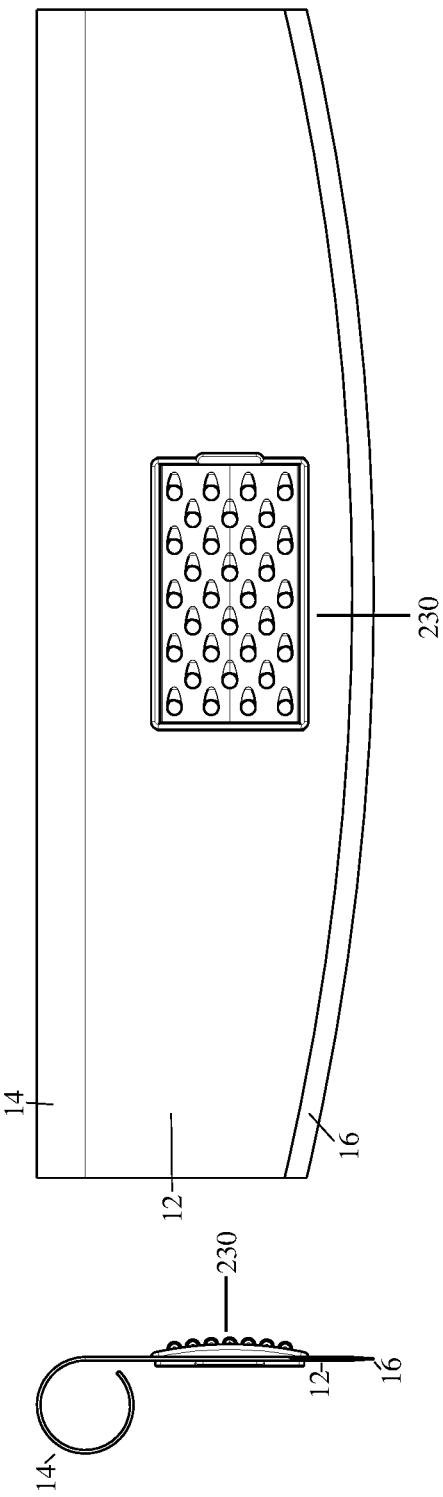
Figure 19P
Figure 19O
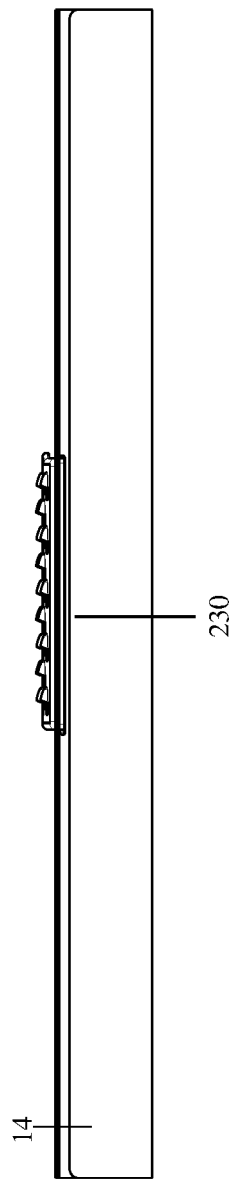
Figure 19Q

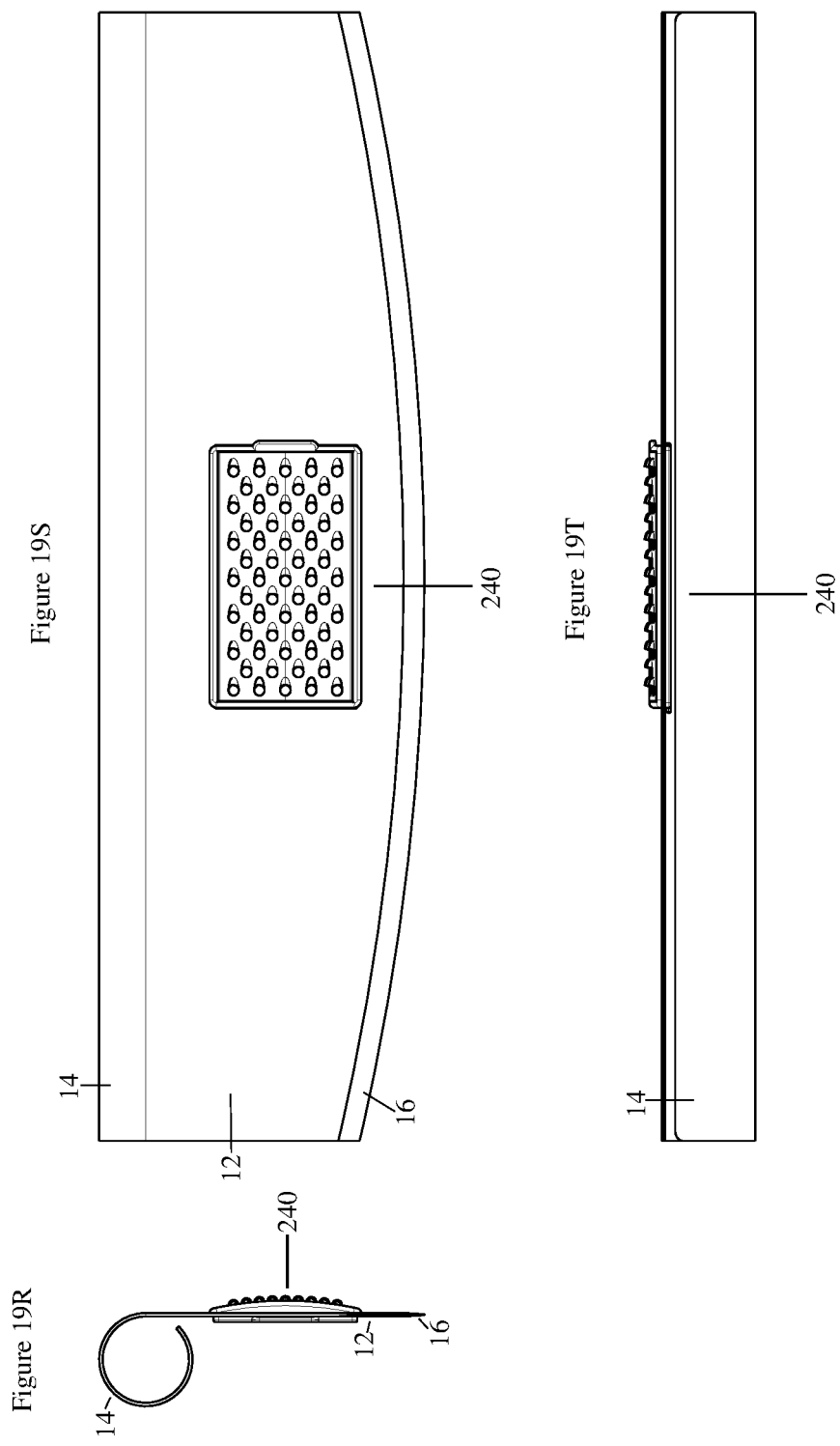

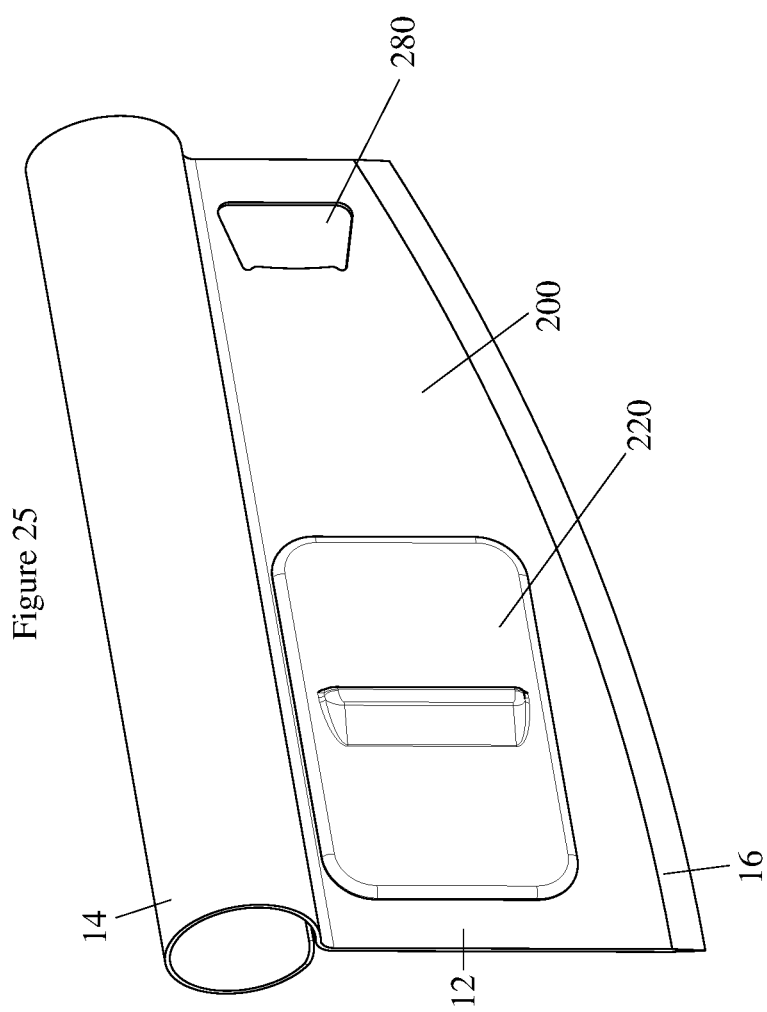

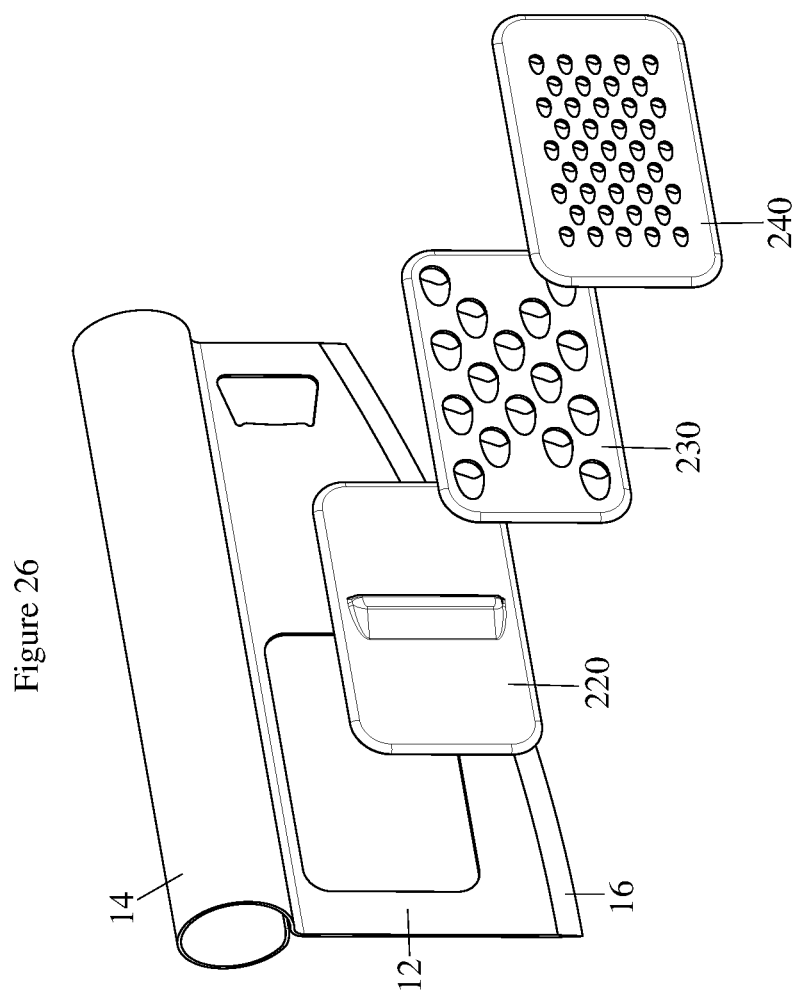

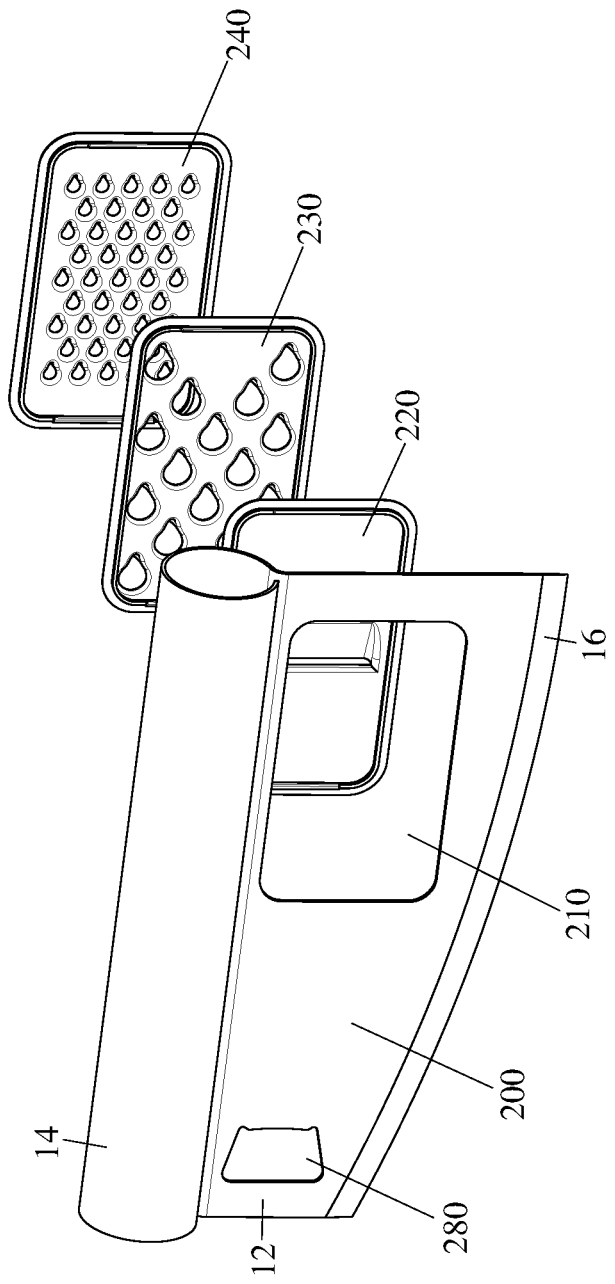

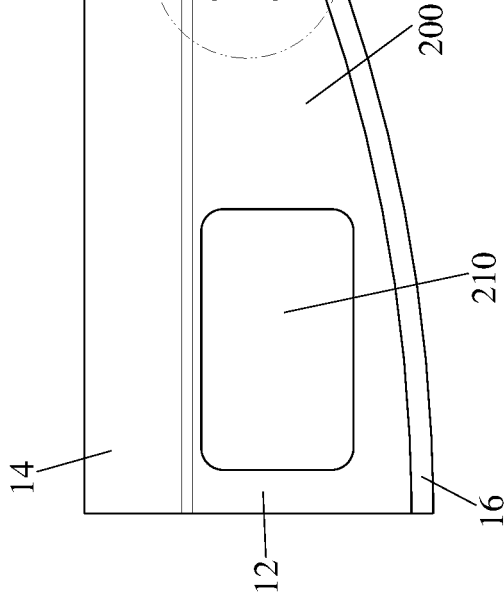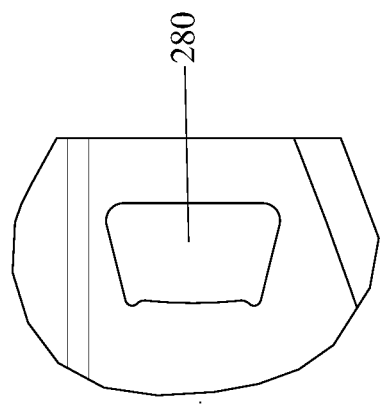

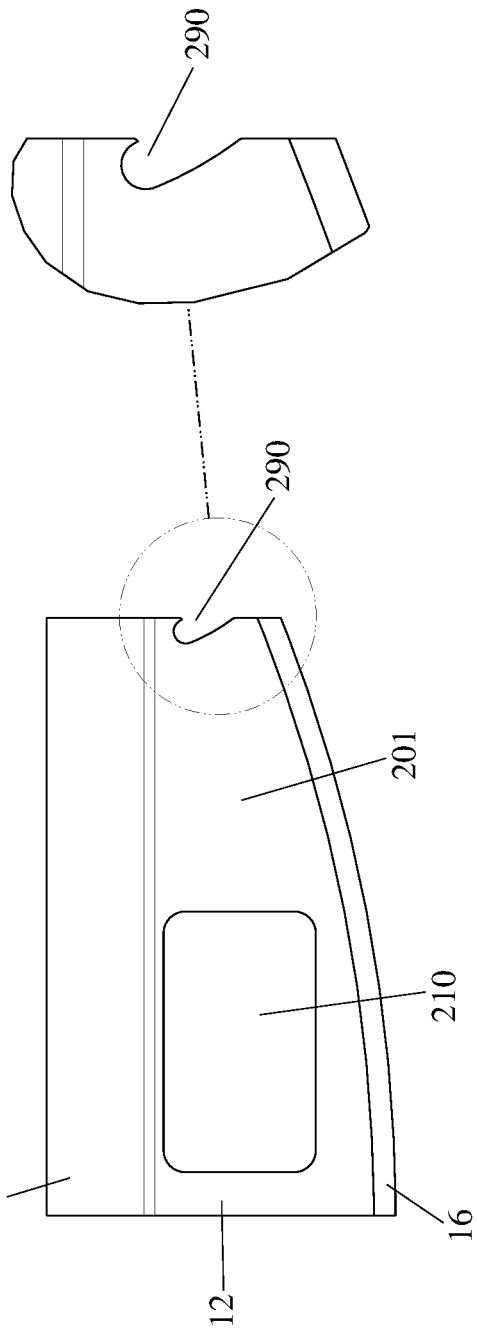

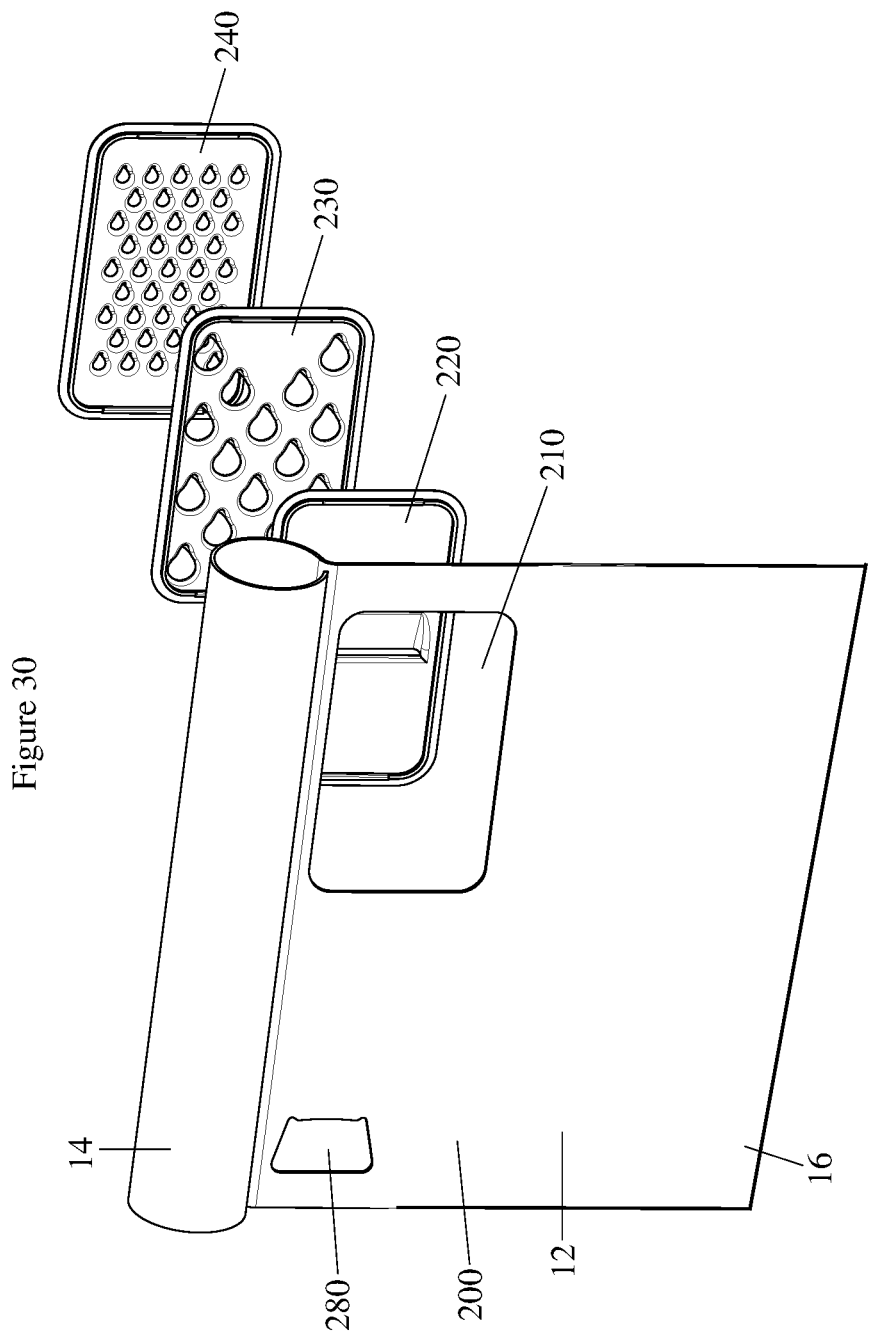

CUTTING DEVICE WITH ADDITIONAL ELEMENTS

This application is a continuation-in-part of U.S. patent application Ser. No. 15/975,770 filed on May 10, 2018 and claims the benefit of priority from U.S. Provisional Patent Application Ser. No. 62/504,526 filed on May 10, 2017 and entitled "Cutting Device With Additional Elements", which is fully incorporated herein by reference for all purposes.

BACKGROUND

Field of Invention

This invention relates to cutting devices commonly used in households and in commercial applications. More particularly, it relates to cutting devices used to cut food items like pizza, tortillas, quesadillas, pies, pastries, brownies & baked goods, caramels, meats, as well as cutting and mincing herbs and vegetables.

Prior Art

Food cutting devices with large blade surfaces and handles located on top of said blade surfaces are well known. These cutting devices are used in applications where a large blade surface is helpful to cut through sizable pieces of food such as meat, large vegetables, pizza, baked goods, etc. The large blade surface can also work as a scraper to scoop the food from a cutting surface into another receptacle.

Exemplary of the prior art is:

Watermolen et al U.S. Pat. No. 5,920,992 describes a pizza cutter with a convex blade with two handles providing finger indentations.

Ghislain U.S. Pat. No. 4,959,905 describes a pizza cutting device with a convexly curved blade with a handle extending the length of the blade. The food cutting device can be stored in a separate holder that receives the blade when not in use.

Spae U.S. Pat. No. 9,434,082 B2 describes a dual knife food cutter apparatus that is configurable into a cutting configuration and a storage configuration.

James U.S. Pat. No. 4,924,575 describes a pizza knife with convex blade with an integral handle that extends the length of the blade. The blade extends down one of the handle sides.

Cremonese U.S. Pat. No. 3,890,707 describes a kitchen knife with a straight edge in the back with an attached handle spanning a portion of the blade with an aperture below for fingers to wrap around. The blade being curved from the straight edge in the back to the point in the front.

Santana U.S. Pat. No. 1,414,098 describes a cigar-maker's knife with a convex blade and a rolled integral handle.

Donnelly U.S. Pat. No. 745,162 describes a combined cleaver and knife device. The cleaver being on one side and the knife being on the other side of this device.

Busch US Patent Application 20150328761 A1 describes a unitary one piece multiple purpose utility tool.

Cutler U.S. Pat. No. 8,201,300 B2 describes a cleaning implement with a handle attached on top to remove liquid and solid food debris from dish surfaces.

Hurtt U.S. Pat. No. 4,097,951 describes a hand tool with a handle integrally attached on top and a bendable spreader blade used for removing or redistributing liquids or other fluent materials.

Smilanich U.S. Pat. No. 7,472,484 B2 describes a universal outdoorsman tool with a multi-edged tool head.

All of the aforementioned devices do not use the planar surface of the large blade for another food or drink related function. The present invention introduces additional food and/or drink related functions into the single rigid material of the planar surface of the blade portion such as cheese grating, vegetable grating, slicing, food sieving, garlic pressing, bottle opening, and various other uses. The cutting device can also have a cavity in the planar surface of the large blade where a removable kitchen tool of various functions can be inserted and then taken back out.

SUMMARY OF THE INVENTION

Embodiments of this cutting device have the additional benefit of increased functionality. The cutting device has additional uses for food preparation reducing the need for other kitchen tools as well as functioning as a convenient multi-use kitchen tool to take on the go. The planar surface of the blade is used as a base in which to integrate other kitchen tools such as a grater, zester, slicer, opener, press, etc., or to have a cavity in the blade surface where a removable kitchen tool can be inserted and then taken back out.

BRIEF DESCRIPTION OF THE DRAWINGS

In the accompanying drawings which form a part of the specifications and are to be read in conjunction therewith and in which like reference numerals are used to indicate like parts in the various views:

FIG. 1A. Is an isometric view of a first embodiment example of a food cutter with a grater integrated into the planar surface of the blade.

FIG. 1B. Is a side view of a first embodiment example of a food cutter with a grater integrated into the planar surface of the blade.

FIG. 1C. Is a front view of a first embodiment example of a food cutter with a grater integrated into the planar surface of the blade.

FIG. 1D. Is a bottom view of a first embodiment example of a food cutter with a grater integrated into the planar surface of the blade.

FIG. 3B. Is a side view of a first embodiment example of a food cutter with a cavity in the planar surface of the blade in which to insert removable elements. A slicer is inserted into the cavity in this embodiment.

FIG. 3C. Is a front view of a first embodiment example of a food cutter with a cavity in the planar surface of the blade in which to insert removable elements. A slicer is inserted into the cavity in this embodiment.

FIG. 3D. Is a bottom view of a first embodiment example of a food cutter with a cavity in the planar surface of the blade in which to insert removable elements. A slicer is inserted into the cavity in this embodiment.

FIG. 3E. Is a side view of a first embodiment example of a food cutter with a cavity in the planar surface of the blade in which to insert removable elements. A coarse grater is inserted into the cavity in this embodiment.

FIG. 3F. Is a front view of a first embodiment example of a food cutter with a cavity in the planar surface of the blade in which to insert removable elements. A coarse grater is inserted into the cavity in this embodiment.

FIG. 3G. Is a bottom view of a first embodiment example of a food cutter with a cavity in the planar surface of the blade in which to insert removable elements. A coarse grater is inserted into the cavity in this embodiment.

FIG. 3H. Is a side view of a first embodiment example of a food cutter with a cavity in the planar surface of the blade in which to insert removable elements. A fine grater is inserted into the cavity in this embodiment.

FIG. 3I. Is a front view of a first embodiment example of a food cutter with a cavity in the planar surface of the blade in which to insert removable elements. A fine grater is inserted into the cavity in this embodiment.

FIG. 3J. Is a bottom view of a first embodiment example of a food cutter with a cavity in the planar surface of the blade in which to insert removable elements. A fine grater is inserted into the cavity in this embodiment.

FIG. 8B. Is a side view of a fourth embodiment example of a food cutter with a grater integrated into the planar surface of the blade. The food cutter has an integral handle and blade which extends down one of the handle sides.

FIG. 8C. Is a front view of a fourth embodiment example of a food cutter with a grater integrated into the planar surface of the blade. The food cutter has an integral handle and blade which extends down one of the handle sides.

FIG. 8D. Is a bottom view of a fourth embodiment example of a food cutter with a grater integrated into the planar surface of the blade. The food cutter has an integral handle and blade which extends down one of the handle sides.

FIG. 8F. Is a side view of a fifth embodiment example of a food cutter with a grater integrated into the planar surface of the blade. The food cutter has an integral handle and blade which extends down one of the handle sides. In this embodiment the integral grater is on the opposite side of the integral handle overhang.

FIG. 8G. Is a front view of a fifth embodiment example of a food cutter with a grater integrated into the planar surface of the blade. The food cutter has an integral handle and blade which extends down one of the handle sides. In this embodiment the integral grater is on the opposite side of the integral handle overhang.

FIG. 8H. Is a bottom view of a fifth embodiment example of a food cutter with a grater integrated into the planar surface of the blade. The food cutter has an integral handle and blade which extends down one of the handle sides. In this embodiment the integral grater is on the opposite side of the integral handle overhang.

FIG. 9F. Is a side view of a food cutter with a grater integrated into the planar surface of the blade. The handle side of the knife is fixedly attached to the blade and not formed integrally out of the same material in this embodiment.

FIG. 9G. Is a front view of a food cutter with a grater integrated into the planar surface of the blade. The handle side of the knife is fixedly attached to the blade and not formed integrally out of the same material in this embodiment.

FIG. 9H. Is a bottom view of a food cutter with a grater integrated into the planar surface of the blade. The handle side of the knife is fixedly attached to the blade and not formed integrally out of the same material in this embodiment.

FIG. 9I. Is an isometric view of a food cutter with a cavity in the planar surface of the blade in which to insert removable elements. The handle side of the knife is fixedly attached to the blade and not formed integrally out of the same material in this embodiment.

FIG. 9J. Is a side view of a food cutter with a cavity in the planar surface of the blade in which to insert removable elements. The handle side of the knife is fixedly attached to the blade and not formed integrally out of the same material in this embodiment. A slicer is inserted into the cavity in this embodiment.

FIG. 9K. Is a front view of a food cutter with a cavity in the planar surface of the blade in which to insert removable elements. The handle side of the knife is fixedly attached to the blade and not formed integrally out of the same material in this embodiment. A slicer is inserted into the cavity in this embodiment.

FIG. 9L. Is a bottom view of a food cutter with a cavity in the planar surface of the blade in which to insert removable elements. The handle side of the knife is fixedly attached to the blade and not formed integrally out of the same material in this embodiment. A slicer is inserted into the cavity in this embodiment.

FIG. 9M. Is a side view of a food cutter with a cavity in the planar surface of the blade in which to insert removable elements. The handle side of the knife is fixedly attached to the blade and not formed integrally out of the same material in this embodiment. A coarse grater is inserted into the cavity in this embodiment.

FIG. 9N. Is a front view of a food cutter with a cavity in the planar surface of the blade in which to insert removable elements. The handle side of the knife is fixedly attached to the blade and not formed integrally out of the same material in this embodiment. A coarse grater is inserted into the cavity in this embodiment.

FIG. 9O. Is a bottom view of a food cutter with a cavity in the planar surface of the blade in which to insert removable elements. The handle side of the knife is fixedly attached to the blade and not formed integrally out of the same material in this embodiment. A coarse grater is inserted into the cavity in this embodiment.

FIG. 9P. Is a side view of a food cutter with a cavity in the planar surface of the blade in which to insert removable elements. The handle side of the knife is fixedly attached to the blade and not formed integrally out of the same material in this embodiment. A fine grater is inserted into the cavity in this embodiment.

FIG. 9Q. Is a front view of a food cutter with a cavity in the planar surface of the blade in which to insert removable elements. The handle side of the knife is fixedly attached to the blade and not formed integrally out of the same material in this embodiment. A fine grater is inserted into the cavity in this embodiment.

FIG. 9R. Is a bottom view of a food cutter with a cavity in the planar surface of the blade in which to insert removable elements. The handle side of the knife is fixedly attached to the blade and not formed integrally out of the same material in this embodiment. A fine grater is inserted into the cavity in this embodiment.

FIG. 19A. Is an isometric view of a food cutter with an integral handle and blade which extends down one of the handle sides. In this embodiment there is a cavity in the planar surface of the blade in which to insert removable elements.

FIG. 19B. Is a side view of a food cutter with an integral handle and blade which extends down one of the handle sides. In this embodiment there is a cavity in the planar surface of the blade in which to insert removable elements. A slicer is inserted into the cavity in this embodiment.

FIG. 19C. Is a front view of a food cutter with an integral handle and blade which extends down one of the handle sides. In this embodiment there is a cavity in the planar surface of the blade in which to insert removable elements. A slicer is inserted into the cavity in this embodiment.

FIG. 19D. Is a bottom view of a food cutter with an integral handle and blade which extends down one of the handle sides. In this embodiment there is a cavity in the planar surface of the blade in which to insert removable elements. A slicer is inserted into the cavity in this embodiment.

FIG. 19E. Is a side view of a food cutter with an integral handle and blade which extends down one of the handle sides. In this embodiment there is a cavity in the planar surface of the blade in which to insert removable elements. A coarse grater is inserted into the cavity in this embodiment.

FIG. 19F. Is a front view of a food cutter with an integral handle and blade which extends down one of the handle sides. In this embodiment there is a cavity in the planar surface of the blade in which to insert removable elements. A coarse grater is inserted into the cavity in this embodiment.

FIG. 19G. Is a bottom view of a food cutter with an integral handle and blade which extends down one of the handle sides. In this embodiment there is a cavity in the planar surface of the blade in which to insert removable elements. A coarse grater is inserted into the cavity in this embodiment.

FIG. 19H. Is a side view of a food cutter with an integral handle and blade which extends down one of the handle sides. In this embodiment there is a cavity in the planar surface of the blade in which to insert removable elements. A fine grater is inserted into the cavity in this embodiment.

FIG. 19I. Is a front view of a food cutter with an integral handle and blade which extends down one of the handle sides. In this embodiment there is a cavity in the planar surface of the blade in which to insert removable elements. A fine grater is inserted into the cavity in this embodiment.

FIG. 19J. Is a bottom view of a food cutter with an integral handle and blade which extends down one of the handle sides. In this embodiment there is a cavity in the planar surface of the blade in which to insert removable elements. A fine grater is inserted into the cavity in this embodiment.

FIG. 19K. Is an isometric view of another embodiment of a food cutter with an integral handle and blade which extends down one of the handle sides. In this embodiment there is a cavity in the planar surface of the blade in which to insert removable elements. In this embodiment the removable elements are inserted into the cavity on the opposite side of the integral handle overhang.

FIG. 19L. Is a side view of a food cutter with an integral handle and blade which extends down one of the handle sides. In this embodiment there is a cavity in the planar surface of the blade in which to insert removable elements. A slicer is inserted into the cavity in this embodiment. In this embodiment the removable elements are inserted into the cavity on the opposite side of the integral handle overhang.

FIG. 19M. Is a front view of a food cutter with an integral handle and blade which extends down one of the handle sides. In this embodiment there is a cavity in the planar surface of the blade in which to insert removable elements. A slicer is inserted into the cavity in this embodiment. In this embodiment the removable elements are inserted into the cavity on the opposite side of the integral handle overhang.

FIG. 19N. Is a bottom view of a food cutter with an integral handle and blade which extends down one of the handle sides. In this embodiment there is a cavity in the planar surface of the blade in which to insert removable elements. A slicer is inserted into the cavity in this embodiment. In this embodiment the removable elements are inserted into the cavity on the opposite side of the integral handle overhang.

FIG. 19O. Is a side view of a food cutter with an integral handle and blade which extends down one of the handle sides. In this embodiment there is a cavity in the planar surface of the blade in which to insert removable elements. A coarse grater is inserted into the cavity in this embodiment. In this embodiment the removable elements are inserted into the cavity on the opposite side of the integral handle overhang.

FIG. 19P. Is a front view of a food cutter with an integral handle and blade which extends down one of the handle sides. In this embodiment there is a cavity in the planar surface of the blade in which to insert removable elements. A coarse grater is inserted into the cavity in this embodiment. In this embodiment the removable elements are inserted into the cavity on the opposite side of the integral handle overhang.

FIG. 19Q. Is a bottom view of a food cutter with an integral handle and blade which extends down one of the handle sides. In this embodiment there is a cavity in the planar surface of the blade in which to insert removable elements. A coarse grater is inserted into the cavity in this embodiment. In this embodiment the removable elements are inserted into the cavity on the opposite side of the integral handle overhang.

FIG. 19R. Is a side view of a food cutter with an integral handle and blade which extends down one of the handle sides. In this embodiment there is a cavity in the planar surface of the blade in which to insert removable elements. A fine grater is inserted into the cavity in this embodiment. In this embodiment the removable elements are inserted into the cavity on the opposite side of the integral handle overhang.

FIG. 19S. Is a front view of a food cutter with an integral handle and blade which extends down one of the handle sides. In this embodiment there is a cavity in the planar surface of the blade in which to insert removable elements. A fine grater is inserted into the cavity in this embodiment. In this embodiment the removable elements are inserted into the cavity on the opposite side of the integral handle overhang.

FIG. 19T. Is a bottom view of a food cutter with an integral handle and blade which extends down one of the handle sides. In this embodiment there is a cavity in the planar surface of the blade in which to insert removable elements. A fine grater is inserted into the cavity in this embodiment. In this embodiment the removable elements are inserted into the cavity on the opposite side of the integral handle overhang.

FIG. 25. Is an isometric view of a dough scraper type cutter with a removable food slicer and an opening in the planar surface of the blade which serves as a bottle opener.

FIG. 26. Is an isometric view of a dough scraper type cutter with several interchangeable removable elements configured to be insertable into a cavity on the planar surface of the blade.

FIG. 27. Is a rear perspective view of a dough scraper type cutter showing the integral bottle opener and cavity in the planar surface of the blade. The removable elements can be inserted into the cavity on the planar surface of the blade.

FIG. 28A. Is a front view of a dough scraper type cutter showing the integral bottle opener and cavity in the planar surface of the blade.

FIG. 28B. Is a detailed view of the integrated bottle opener of FIG. 28A.

FIG. 29A. Is a front view of a dough scraper type cutter showing the cavity in the planar surface of the blade and a bottle opener located on the side of the blade.

FIG. 29B. Is a detailed view of the side bottle opener of FIG. 29A.

FIG. 30. Is a rear perspective view of a dough scraper type cutter showing the integral bottle opener and cavity in the planar surface of the blade. The removable elements can be inserted into the cavity of the planar surface of the blade. The blade has a straight cutting edge.

DEFINITIONS

In this specification, the term "food cutter" refers to a cutting device with a large blade surface and a handle and/or grips located at the top of said blade surface that is generally used to cut pizza, baked goods, meat, etc. The large blade surface can also be used to scrape and scoop food from a cutting surface into another receptacle. Although the dimensions of the food cutter can vary, the food cutter should be of sufficient size to cut conventionally sized pizzas, which would be in the range of 6 to 24 inches in length from side to side. The width would be in the range of 2 to 10 inches from the top of the handle to the bottom of the blade.

In this specification, the term "dough scraper type cutter" refers to a cutting device with a large blade surface and a handle and/or grips located at the top of said blade surface that is generally used to process dough, cut baked goods, or meat. The large blade surface can also be used to scrape and scoop food from a cutting surface into another receptacle. The cutting edge can be angled or straight, and can be sharp or blunt. The sizing of this device will be similar to other dough scrapers currently in the marketplace. Ranging in 3 to 14 inches in total length from side to side, and 2 to 10 inches in width from the top of the handle to the bottom of the blade.

In this specification, the term "blade" refers to a generally planar cutting element.

In this specification, the terms "cutting side" or "cutting edge" refers to a bottom edge along a blade; and the terms "handle side", "handle edge", or "handle portion" refer to the top edge of a blade which typically has an enlarged cross section and/or grips.

DETAILED DESCRIPTION

Figure 4:
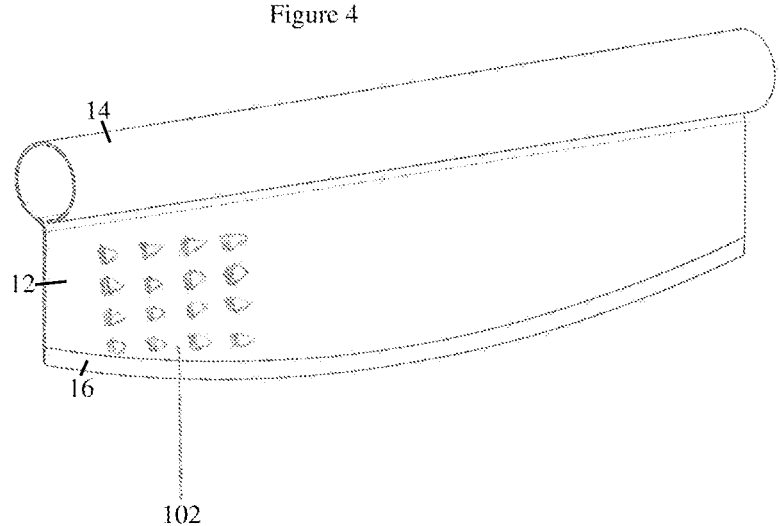
FIG. 4. Is an isometric view of a second embodiment example of a food cutter with a grater integrated into the planar surface of the blade.
Figure 6:
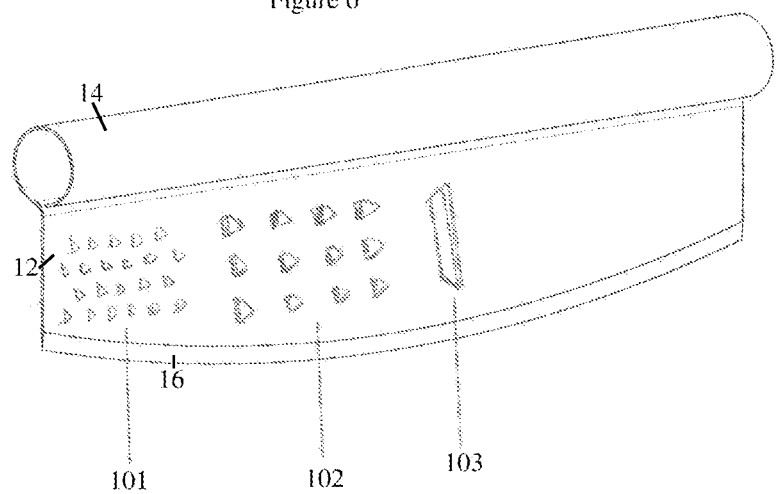
FIG. 6. Is an isometric view of a third embodiment example of a food cutter with a small grater, a large grater, and a food slicer integrated into the planar surface of the blade.
Figure 7:
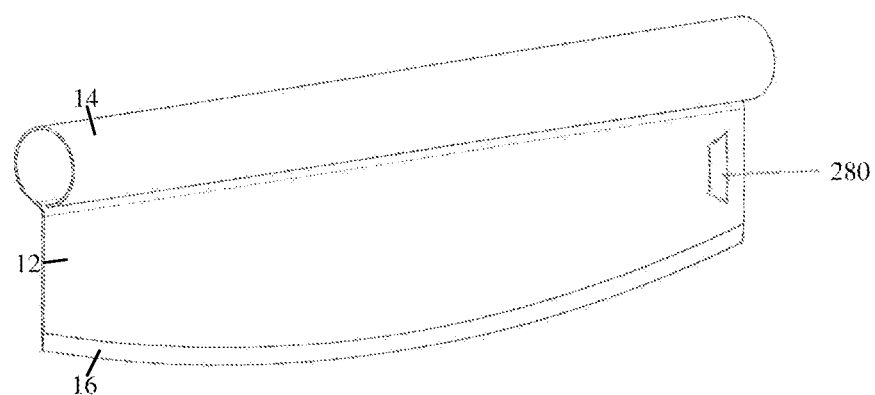
FIG. 7. Is an isometric view of a food cutter with a bottle opener integrated into the planar surface of the blade.
Figure 8A:
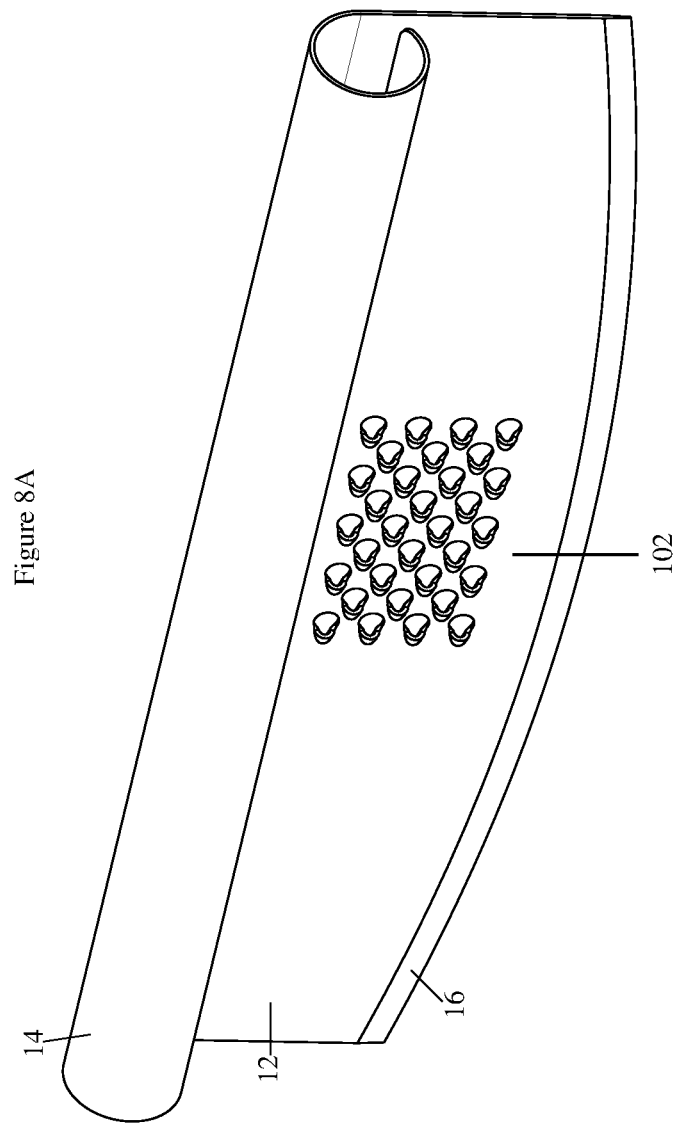
FIG. 8A. Is an isometric view of a fourth embodiment example of a food cutter with a grater integrated into the planar surface of the blade. The food cutter has an integral handle and blade which extends down one of the handle sides.
Figure 8E:
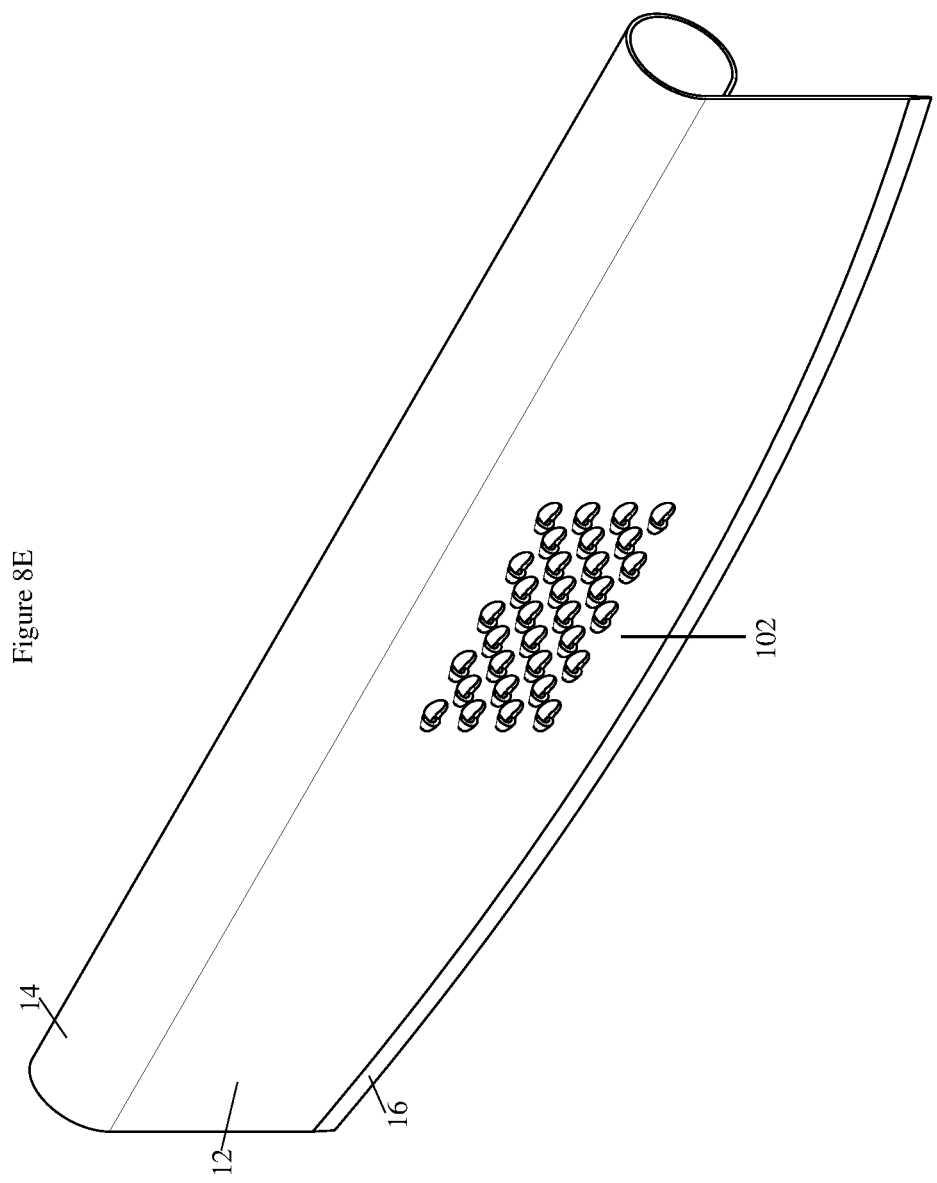
FIG. 8E. Is an isometric view of a fifth embodiment example of a food cutter with a grater integrated into the planar surface of the blade. The food cutter has an integral handle and blade which extends down one of the handle sides. In this embodiment the integral grater is on the opposite side of the integral handle overhang.
Figure 9A:
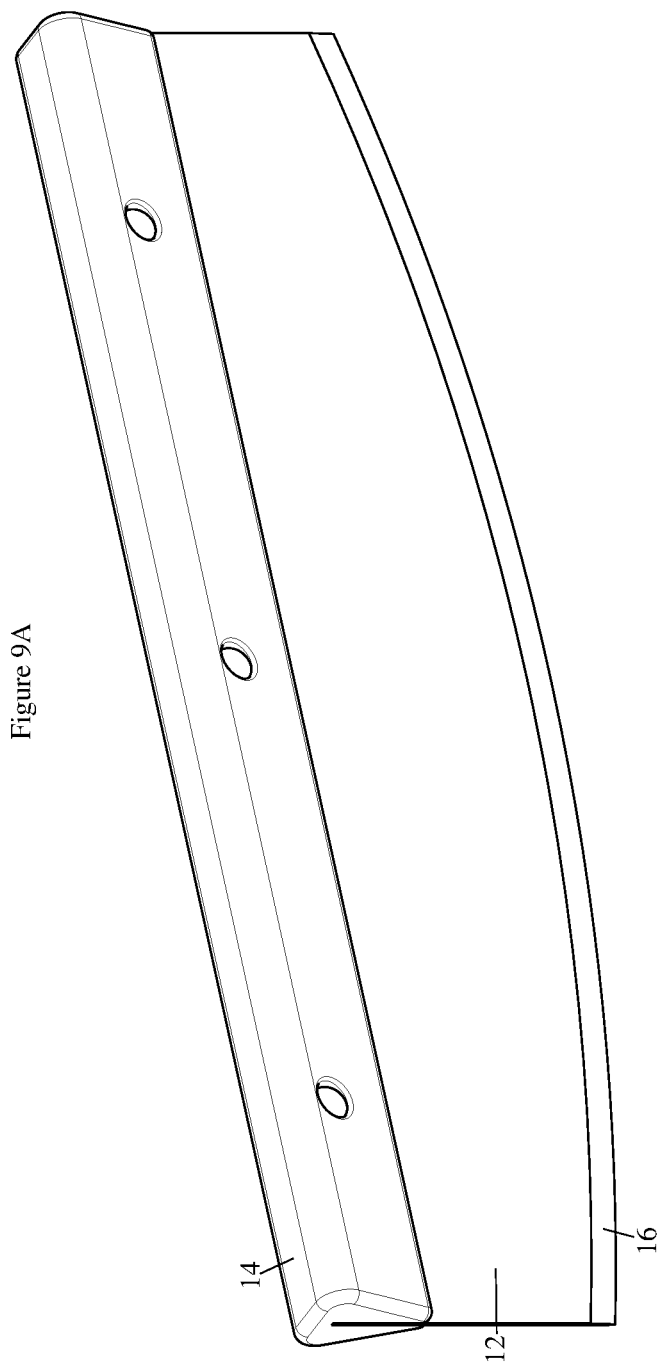
FIG. 9A. Is an isometric view of a food cutter embodiment where the handle side of the knife is fixedly attached to the blade and not formed integrally out of the same material.
Figure 9C:
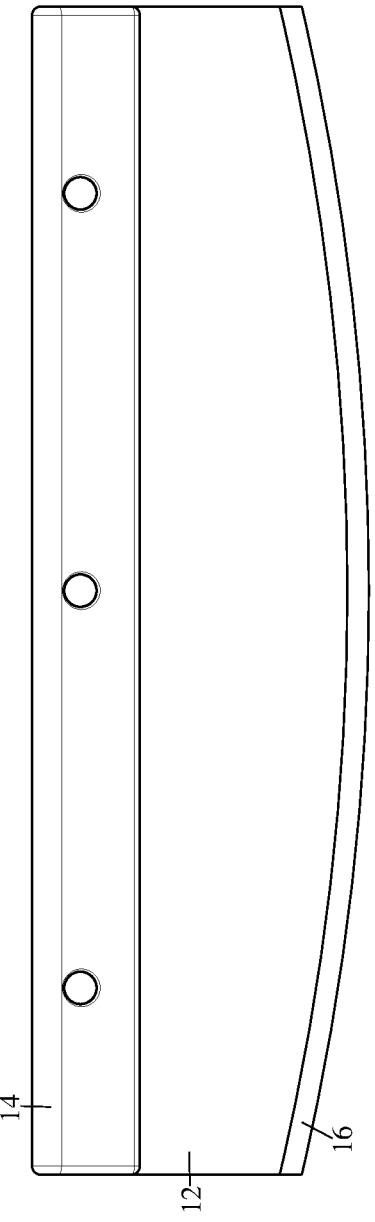
FIG. 9C. Is a front view of a food cutter embodiment where the handle side of the knife is fixedly attached to the blade and not formed integrally out of the same material.
Figure 9D:
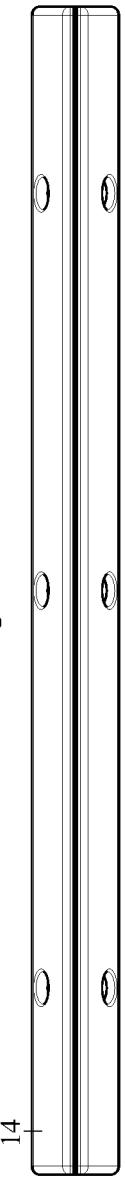
FIG. 9D. Is a bottom view of a food cutter embodiment where the handle side of the knife is fixedly attached to the blade and not formed integrally out of the same material.
Figure 9B:
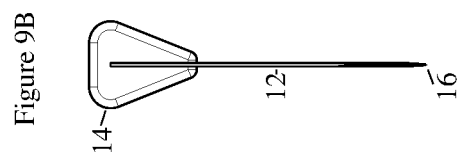
FIG. 9B. Is a side view of a food cutter embodiment where the handle side of the knife is fixedly attached to the blade and not formed integrally out of the same material.
Figure 9E:
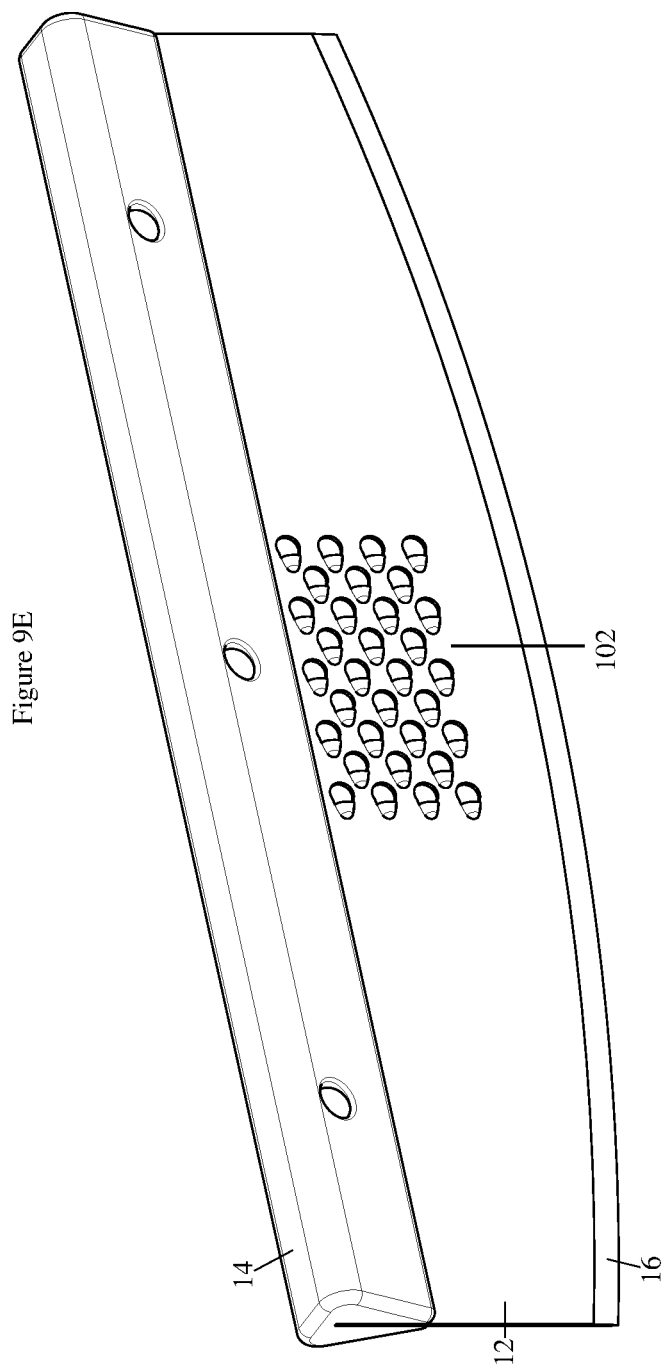
FIG. 9E. Is an isometric view of a food cutter with a grater integrated into the planar surface of the blade. The handle side of the knife is fixedly attached to the blade and not formed integrally out of the same material in this embodiment.
Figure 10:
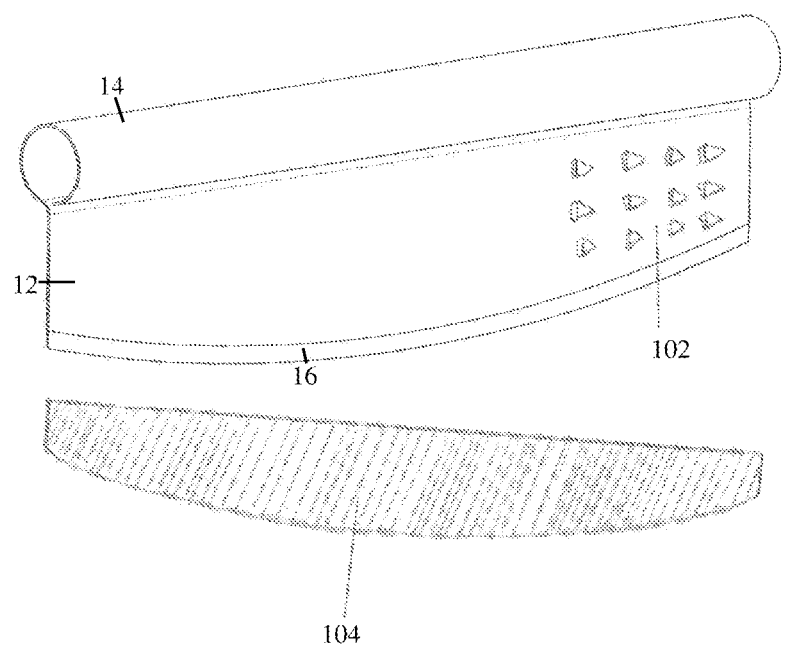
FIG. 10. Is an isometric view of a food cutter with blade cover.
Figure 11:
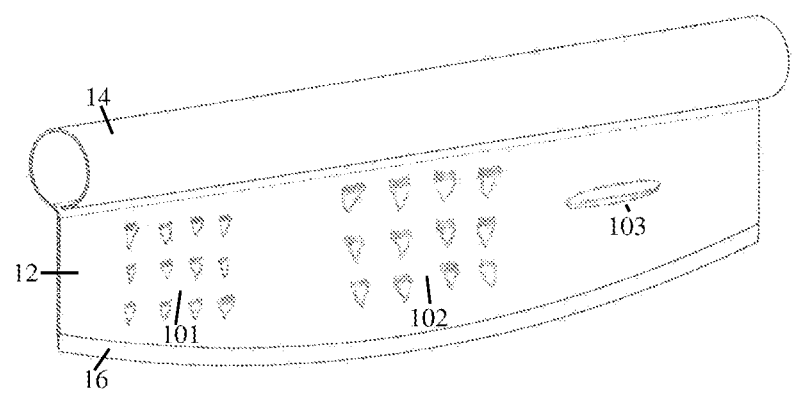
FIG. 11. Is an isometric view of another embodiment of a food cutter with a small grater, a large grater, and a food slicer integrated into the planar surface of the blade and with a vertical element orientation.
Figure 12:
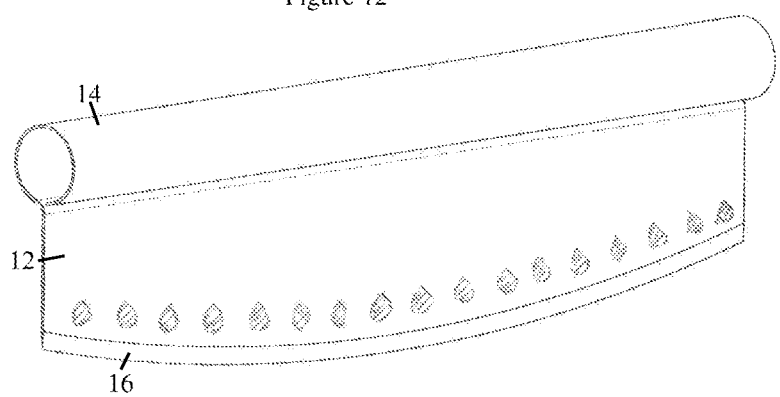
FIG. 12. Is an isometric view of a food cutter with a Granton cutting edge.
Figure 13:
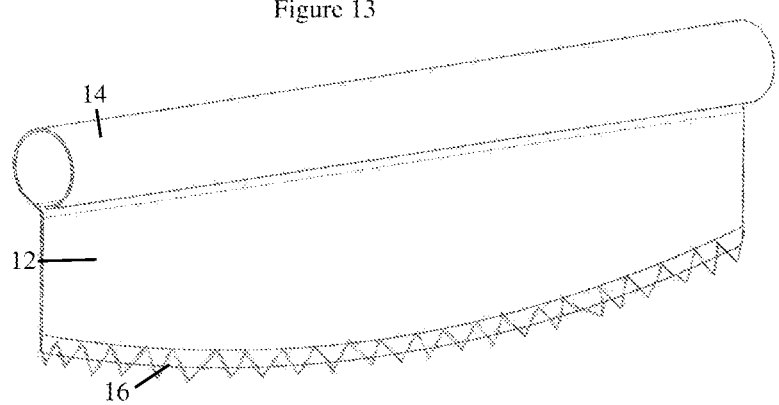
FIG. 13. Is an isometric view of a food cutter with a serrated cutting edge.
Figure 32:
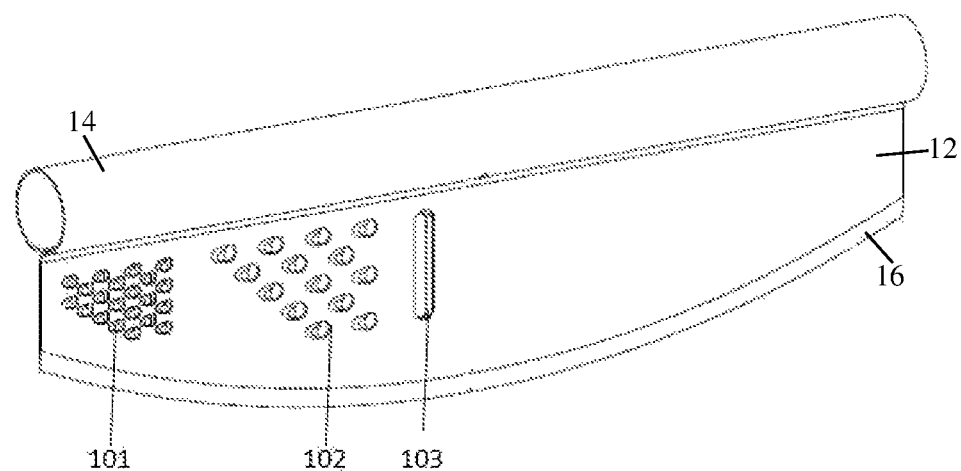
FIG. 32. Is an isometric view of another embodiment example of a food cutter with a small grater, a large grater, and a food slicer integrated into the planar surface of the blade.
Figure 42:
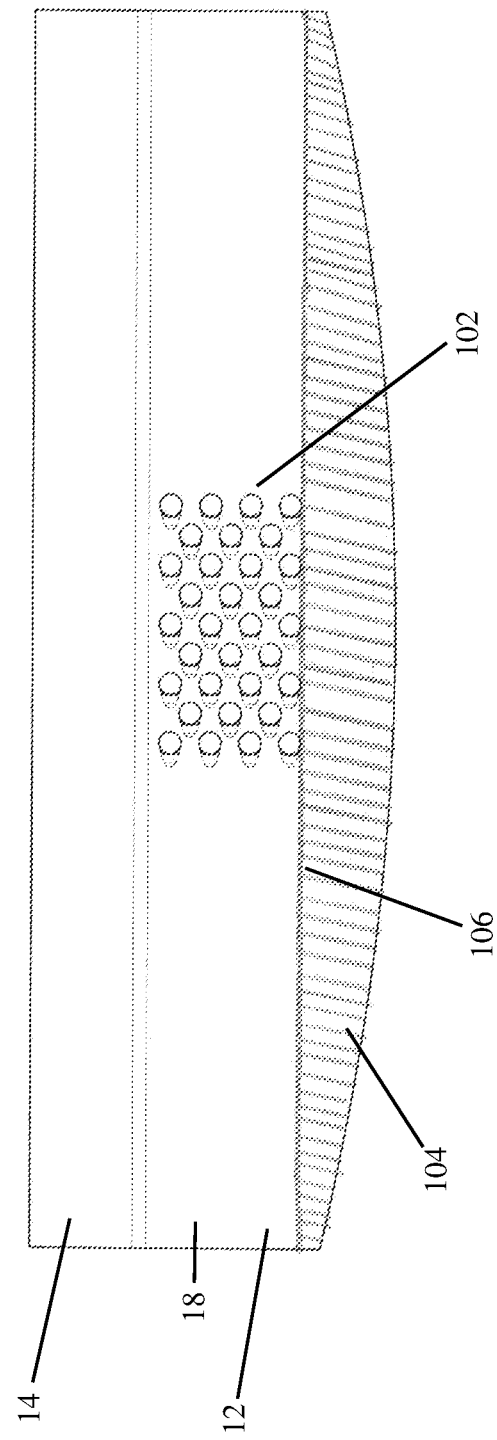
FIG. 42. Is a front view of a food cutter with a grater integrated into the planar surface of the blade. The blade cover is attached to provide protection against the blade bottom cutting edge while utilizing the grater.
Figure 43:
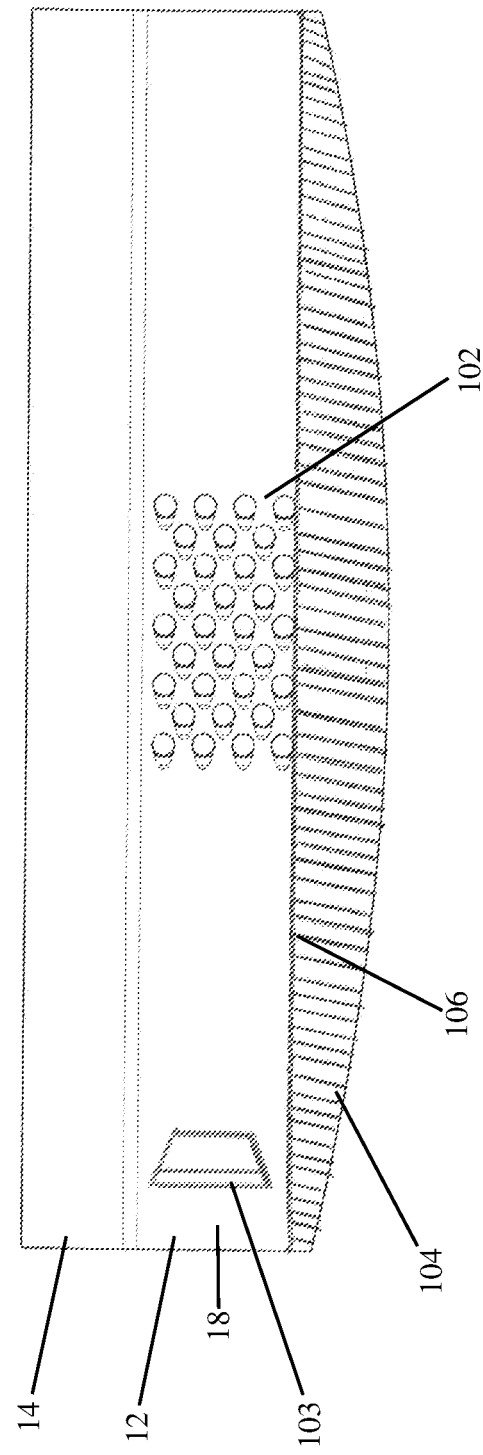
FIG. 43. Is a front view of a food cutter with a grater and slicer integrated into the planar surface of the blade. The blade cover is attached to provide protection against the blade bottom cutting edge while utilizing the grater and slicer.
Figure 46:
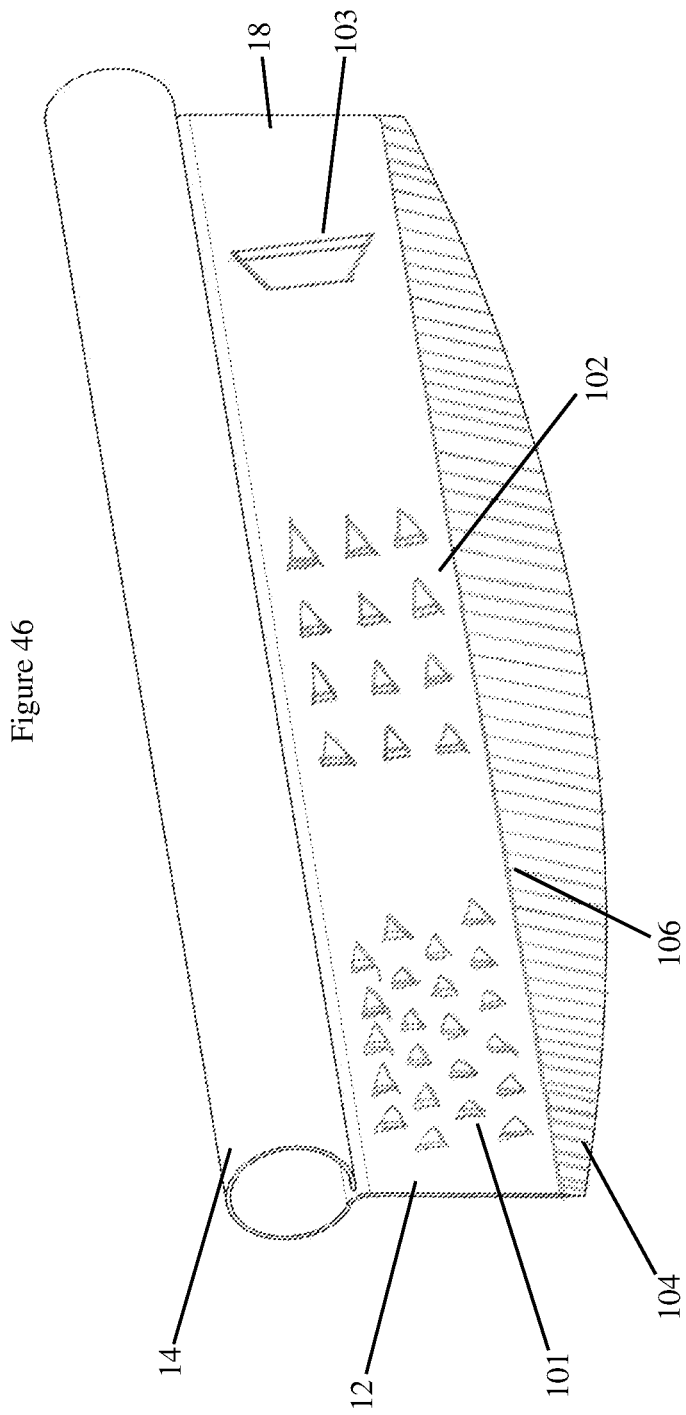
FIG. 46. Is an isometric view of a food cutter with a small grater, a large grater, and a slicer integrated into the planar surface of the blade. The blade cover is attached to provide protection against the blade bottom cutting edge while utilizing the graters and slicer.
Figure 48:
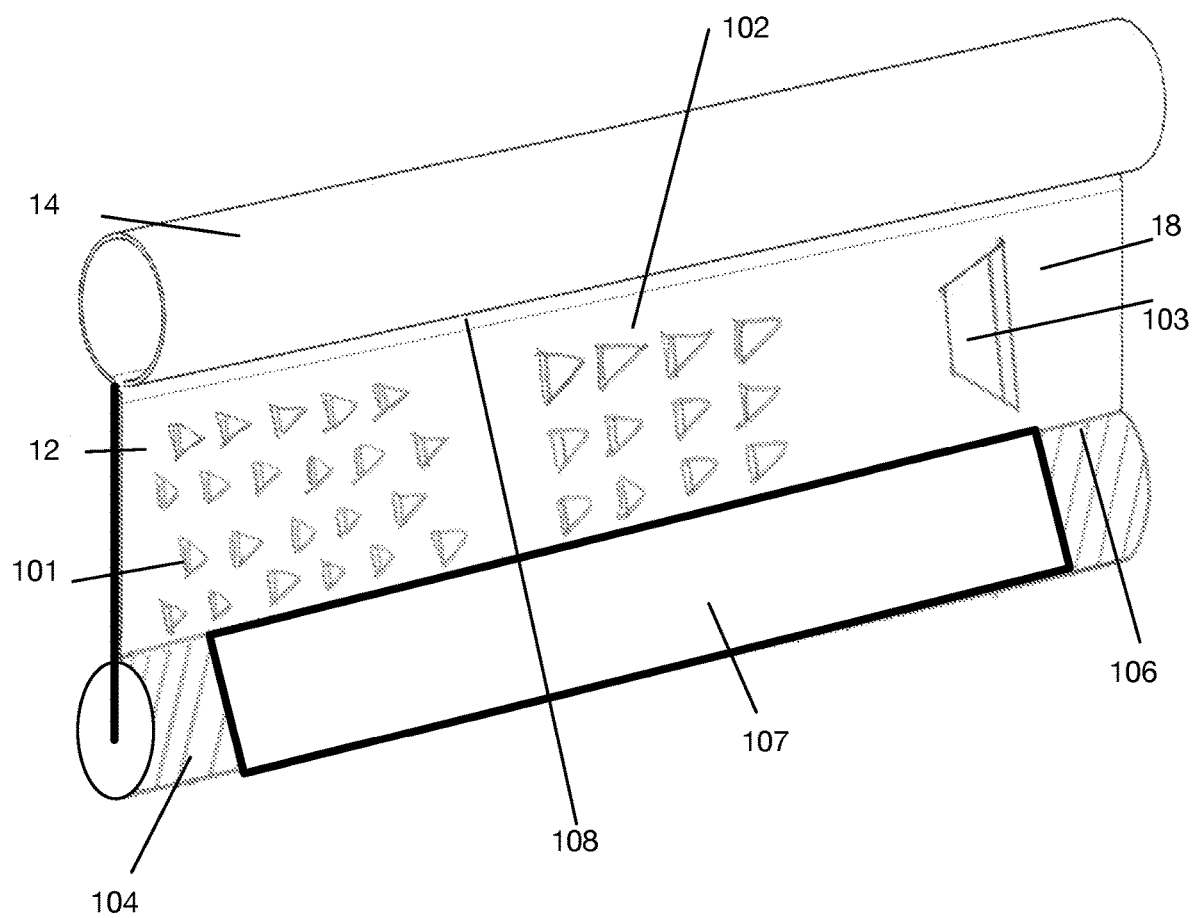
FIG. 48. Is an isometric view of a food cutter with a small grater, a large grater, and a slicer integrated into the planar surface of the blade. The blade cover is attached to provide protection against the blade bottom cutting edge while utilizing the graters and slicer. The blade cover is shaped to have a similar grip surface as the handle portion.
Figure 49:
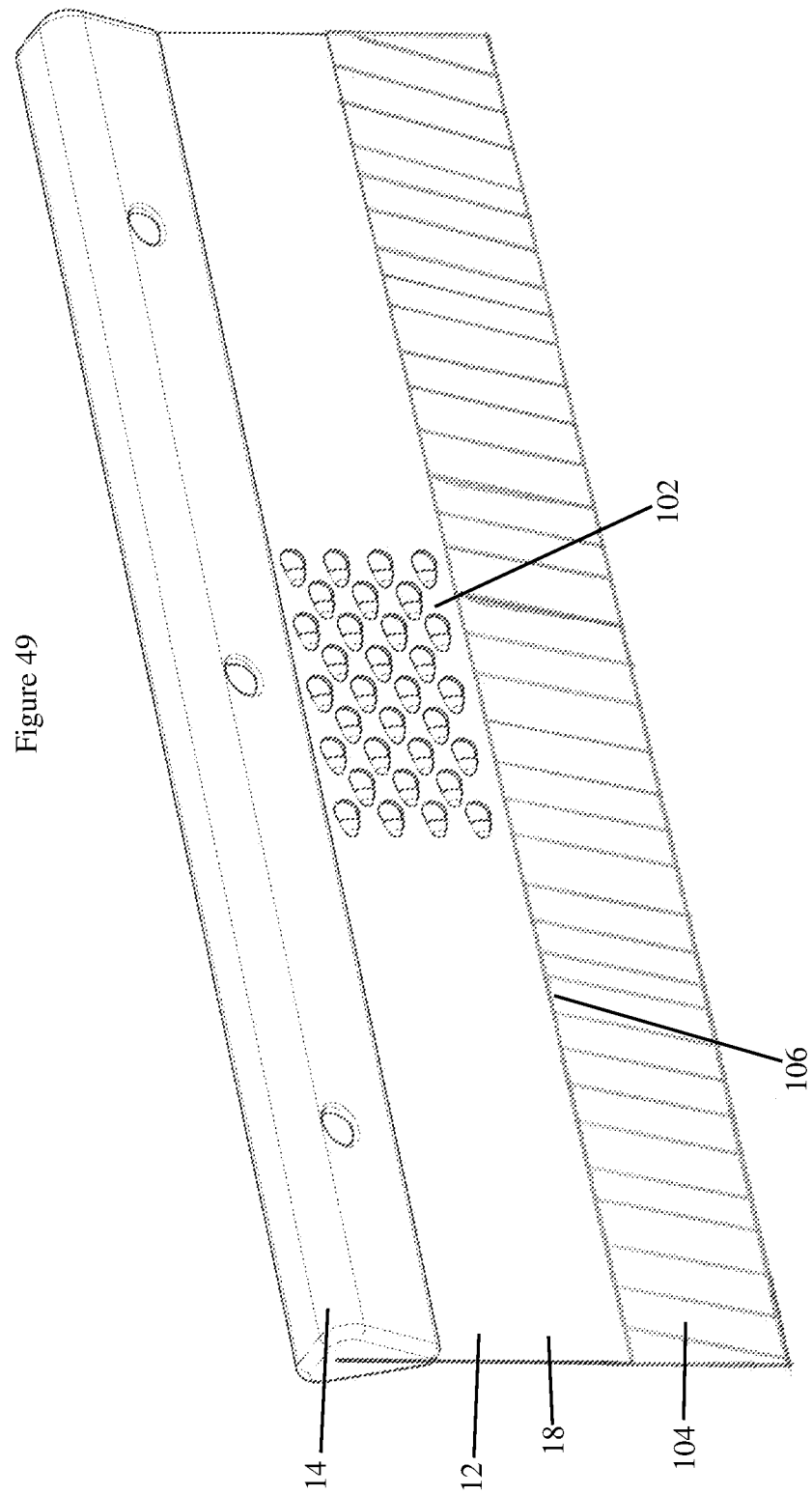
FIG. 49. Is an isometric view of a food cutter with a grater integrated into the planar surface of the blade. The blade cover is attached to provide protection against the blade bottom cutting edge while utilizing the grater. The handle portion is a different material than the blade portion. The blade cover is shaped to have a similar grip surface as the handle portion.

Referring now to the drawings in more detail, FIG. 1A through FIG. 1D is an embodiment of a food cutter with an integral grater 102. This embodiment is formed as a single stainless steel piece in this embodiment, but in other embodiments the apparatus is comprised of food grade material in a group consisting of food grade metal, plastic, silicone, rubber, carbon fiber, ceramic, wood, or a combination thereof. In this embodiment the grater 102 is stamped into the metal. In other embodiments the grater is attached by welding, or other means of connection such as rivets, screws, glue, and various other connection methods or combinations thereof. The integrated grater can be located anywhere on the planar surface of the blade 12 such as to the side as referenced in FIG. 4. FIG. 6 references a food cutter with different sized graters and slicers integrated into the planar surface of the blade 12. In FIG. 32, element 101 demonstrates a small opening food grater, element 102 demonstrates a large opening food grater and element 103 demonstrates a food slicer. These elements can be located anywhere on the planar surface of the blade 12. These elements can also be in different combinations, configurations, orientations, and sizes. FIG. 11 demonstrates a food cutter with the integral elements in a vertical orientation. In other embodiments only one of these elements are integrated into the planar surface of the blade 12. A food cutter may also integrate a bottle opener 280 or other kitchen tools into the planar surface of the blade as referenced in FIG. 7. In other embodiments the handle side 14 of the food cutter is fixedly attached to the blade and not formed integrally out of the same material as referenced in FIG. 9A through FIG. 9H. The handle side 14 can be solid or hollow in other embodiments. Referring back to FIG. 1A through FIG. 1D, the cutting side 16 of the blade has a sharpened edge in this embodiment and extends along substantially the entirety of the bottom portion of the blade 12. In this embodiment, the cutting side 16 of the blade has a convex edge to provide a cut with a simple rocking motion of the knife. In other embodiments, the cutting side may be blunt for uses such as in processing dough. The cutting edge can be straight but need not be, and need not be parallel to the handle edge. In some examples, the cutting edge of the blade is curved so that the inside edge is longer than the outside edge, and the device may be rocked along the cutting edges of the blade. In other embodiments the blade further comprises a Granton edge as shown in FIG. 12 or a serrated edge as shown in FIG. 13. In other embodiments the food cutter has a cover 104 to conceal the cutting side 16 of the blade as referenced in FIG. 10. This blade cover 104 is comprised of food grade material in a group consisting of food grade metal, plastic, silicone, rubber, carbon fiber, ceramic, wood, or a combination thereof, and can be of various shapes & sizes. The blade cover can also act as a protective shield while using the kitchen tool elements on the blade portion. FIG. 42 shows the blade cover 104 attached to the food cutter with the large grater 102 still exposed. The large grater 102 can still be utilized while the cutting edge of the blade is now covered and the user is protected by the blade cover 104 being attached to the food cutter. FIG. 43 references another embodiment with a slicer 103 and grater 102 both available for use while the blade cover 104 is attached to the food cutter. The blade cover 104 can also function as a guide for food items while utilizing various kitchen tools on the blade portion 12. The handle portion 14 and the top edge 106 of the blade cover 104 form a channel 18 when the blade cover 104 is attached to the blade portion 12. The blade cover and handle portion act as guides on either side of this channel 18 for food items while utilizing the various kitchen tools on the blade portion. FIG. 46 is an embodiment with a small grater 101, a large grater 102, and a slicer 103 located on the blade portion 12 of the food cutter. The top edge 106 of the blade cover 104 and the handle portion 14 form a channel 18 on the blade portion 12 in which these kitchen tool elements can be used in a horizontal orientation while the blade cover 104 is attached to the food cutter and protecting the user from the bottom cutting side of the blade. The bottom edge 108 of handle portion 14 and the top edge 106 of the blade cover 104 act as guides on the sides of the channel 18 for the food items when using the kitchen tool items in a horizontal orientation. The food cutter can be positioned with one side on a surface and the other side raised to utilize the kitchen tools located on the blade portion 12. The food cutter can also be positioned in the air above other food items and the kitchen tool elements can then be utilized on the blade portion 12. For example, grating cheese above a pizza. Referencing FIG. 48, in other embodiments the blade cover 104 can be manufactured to have a grip 107 similar to the handle portion 14. In this embodiment both the handle portion 14 and the blade cover 104 have a similar cylindrical shape in which the user can grip. FIG. 49 is another example where the blade cover 104 is manufactured to have a grip similar to the handle portion 14. The handle portion 14 of FIG. 49 is a different material than the blade portion 12. The handle portion and the blade cover can be various sizes and shapes such as square, triangle, cylindrical, or other shapes in other embodiments.

Figure 14:
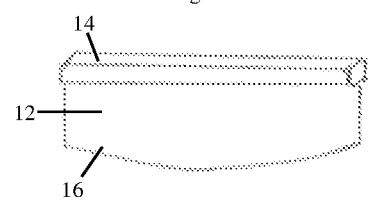
FIG. 14. Is an isometric view of a food cutter with a square shaped handle.
Figure 15:
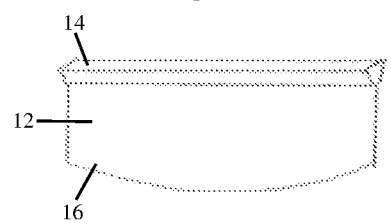
FIG. 15. Is an isometric view of a food cutter with a triangular shaped handle.
Figure 18:
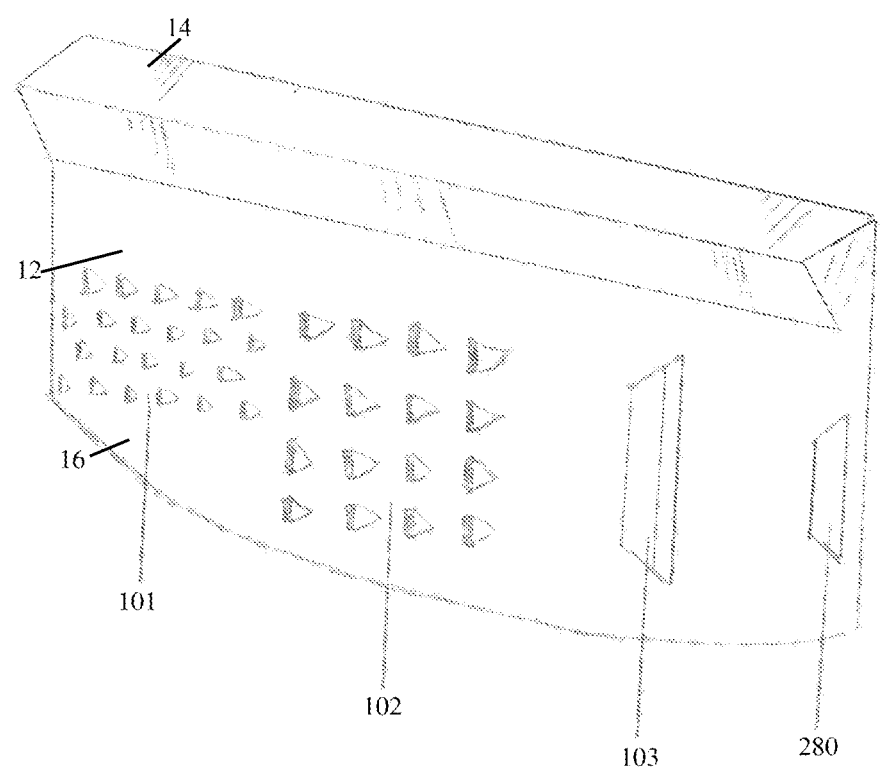
FIG. 18. Is an isometric view of a food cutter with an integral handle and blade which extends down one of the handle sides. In this embodiment there are various integral kitchen tool elements in the planar surface of the blade.
Figure 44:
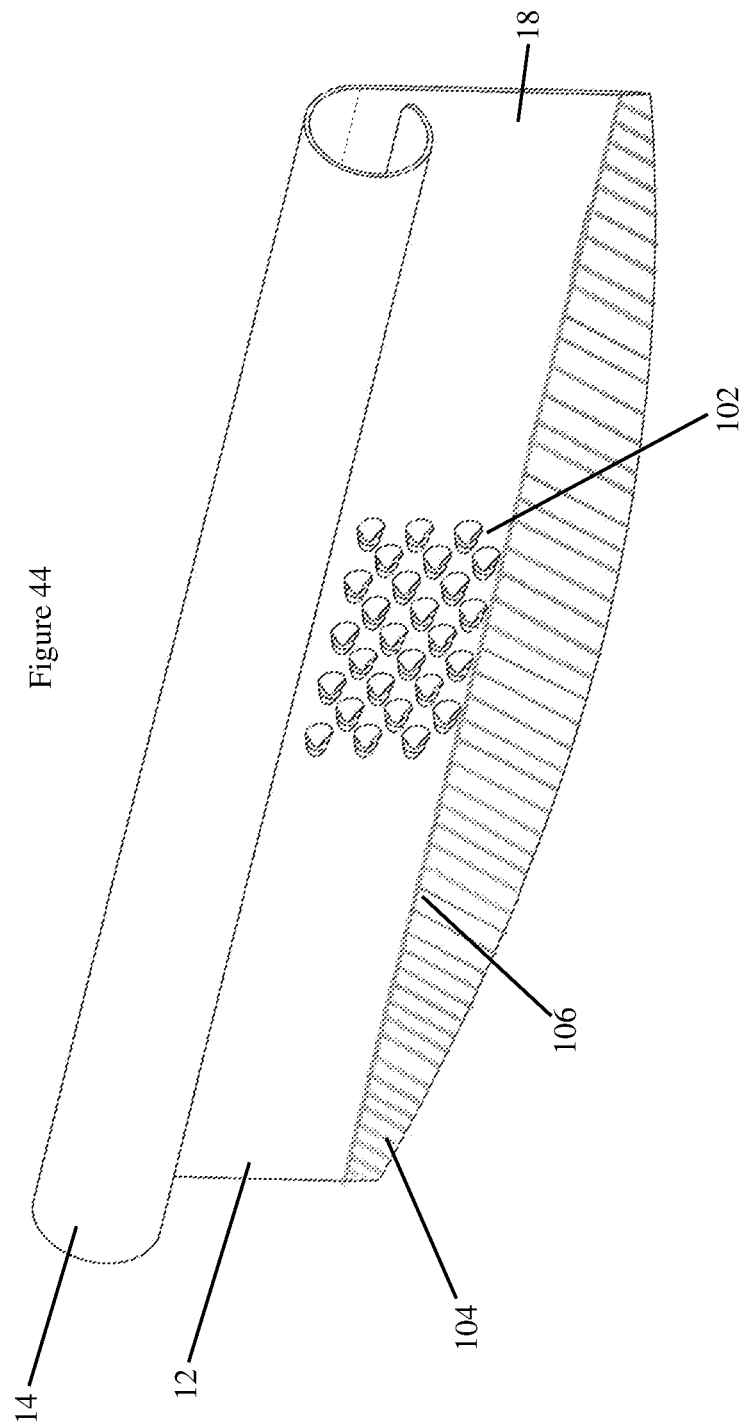
FIG. 44. Is an isometric view of a food cutter with a grater integrated into the planar surface of the blade portion which extends down one of the handle sides. The blade cover is attached to provide protection against the blade bottom cutting edge while utilizing the grater.
Figure 45:
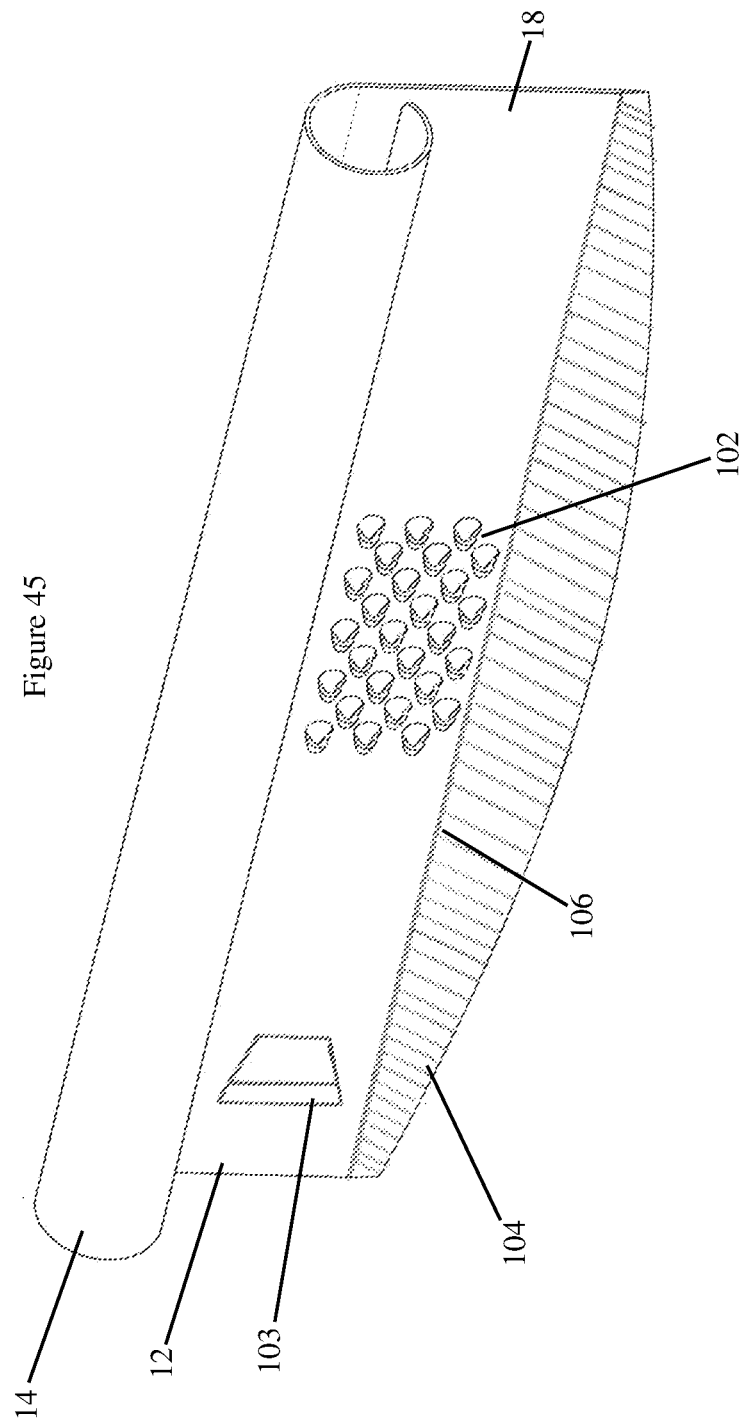
FIG. 45. Is an isometric view of a food cutter with a grater and slicer integrated into the planar surface of the blade which extends down one of the handle sides. The blade cover is attached to provide protection against the blade bottom cutting edge while utilizing the grater and slicer.
Figure 47:
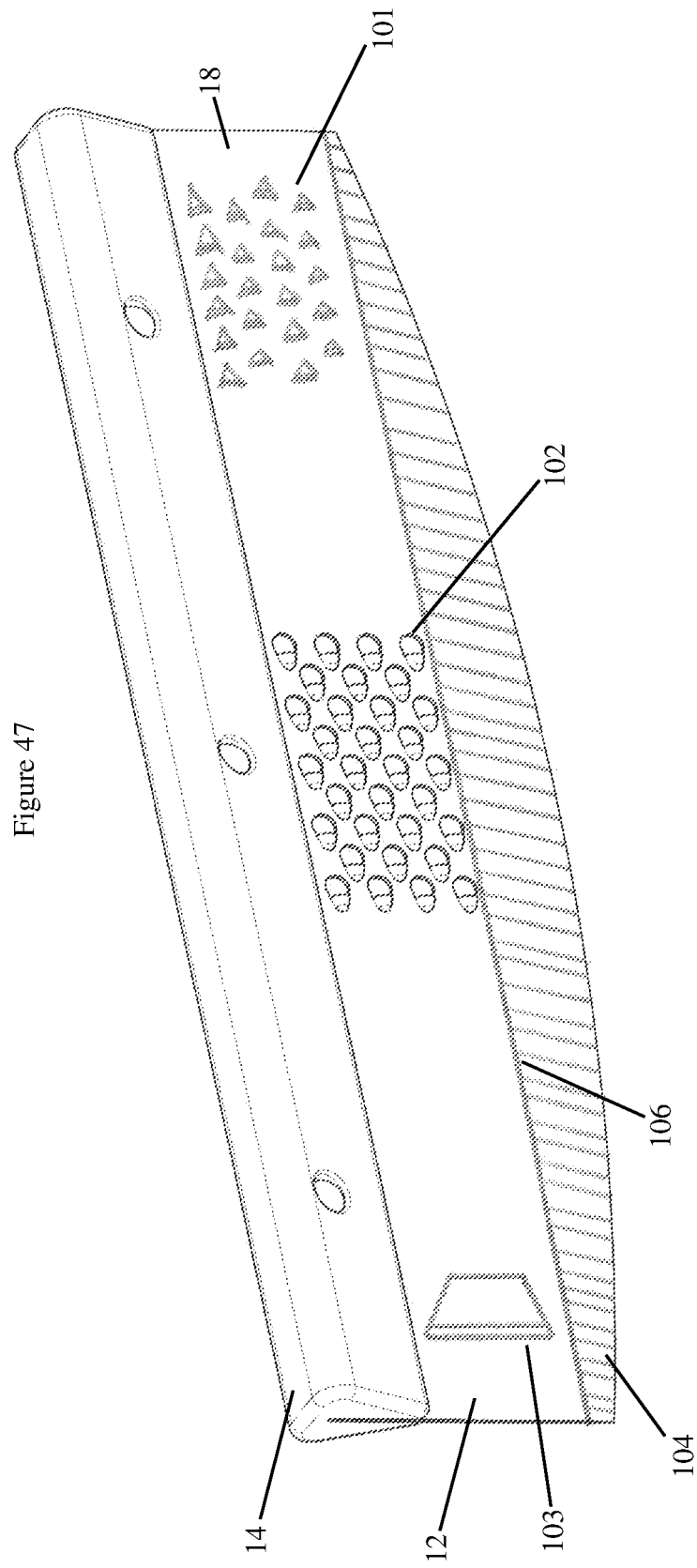
FIG. 47. Is an isometric view of a food cutter with a small grater, a large grater, and a slicer integrated into the planar surface of the blade. The blade cover is attached to provide protection against the blade bottom cutting edge while utilizing the graters and slicer. The handle portion is a different material than the blade portion in this embodiment.

In the embodiment referenced in FIG. 1A through FIG. 1D, there is a handle side 14 opposite to the cutting side 16 and substantially parallel to the cutting side comprising a hollow channel fixedly attached to the blade. In this embodiment, the handle side 14 of the blade is a cylindrical shaped tube. In other embodiments, the handle side of the blade comprises a polygon shaped cross section. In other embodiments, the handle side is square as referenced in FIG. 14, or a triangular shape as referenced in FIG. 15. The handle side can be of various shapes & sizes. As referenced in FIG. 1A through FIG. 1D, the handle side 14 is formed so the blade extends down from the middle of the handle side in this embodiment. In other embodiments the handle portion 14 is formed so the blade 12 extends down one of the sides of the handle as referenced in FIG. 8A through FIG. 8H. FIG. 8A through FIG. 8D shows the integral grater located on the same side of the handle portion overhang, while FIG. 8E through FIG. 8H shows the integral grater located on the opposite side of the handle portion overhang. The embodiments referenced in FIG. 8A through FIG. 8H can have various kitchen tool elements integral to the blade surface as referenced in FIG. 18. The handle portion can function as a guide for food items while utilizing the kitchen tool elements in different embodiments. FIG. 46 shows a centered handle portion 14 that can function as a guide for food items. FIG. 44 & FIG. 45 show an off-centered handle portion 14 that can function as a guide for food items. FIG. 47 shows a handle portion 14 that is a different material than the blade portion 12 and has a triangular shape. The handle portion 14 can be used as a guide for food items while utilizing the various kitchen tool elements on the blade portion 12. The handle portion 14 in these different embodiments also acts as a protruding shield while the food cutter is in storage. The handle portion 14 protrudes from the blade portion 12 to protect the kitchen tool elements such as the small grater 101, large grater 102, or slicer 103. The handle portion 14 can prevent other kitchen tools in a drawer from hitting, scraping, or bending the kitchen tool elements on the blade portion 12.

Figure 5:
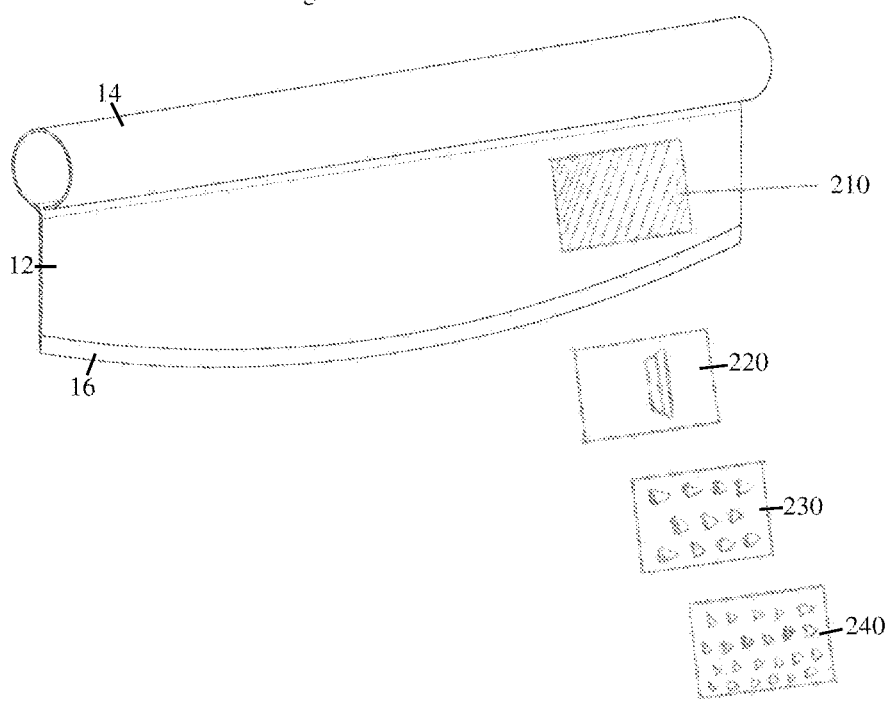
FIG. 5. Is an isometric view of a second embodiment example of a food cutter with a cavity in the planar surface of the blade in which to insert removable elements.

FIG. 3A through FIG. 3J represent a food cutter embodiment with several interchangeable removable elements configured to be insertable into a cavity on the food cutter blade 12. The cavity 210 on the food cutter can be located anywhere on the planar surface of the blade 12 such as to the side as referenced in FIG. 5. The cavity 210 can also have rounded corners as shown for example in FIG. 27. The cavity can be different shapes & sizes in other embodiments such as a square, rectangle, circle, or oval. The orientation of these shapes can be vertical or horizontal on the planar surface of the blade.

Example removable elements include a food slicer 220, a large opening grater 230, and a small opening grater 240. In this embodiment, each of the removable elements has a peripheral ridge that snaps into the cavity 210. The back side of the peripheral ridge fits through the cavity, while the front side of the peripheral ridge has a larger overhang or frame that will not fit through the cavity, so the removable element will not pass through. In other embodiments the removable elements can attach to the blade cavity by various other mating connections or configurations. Some possible embodiments of other mating configurations include a gasket type connection where a shaped piece or ring made of flexible material such as rubber inserts into the cavity and then enlarges when it is on the other side of the cavity, securing the removable element to the blade cavity. In this embodiment the removable element has an overhang or frame that will not fit through the cavity, so the removable element will not pass through. Another mating configuration embodiment includes the removable elements having male snaps that are flexible and made from a material such as plastic or metal. The male snaps fit through the blade cavity and then snap back to secure the removable element once the snaps are on the other side of the blade cavity. The removable element has an overhang or frame that will not fit through the cavity, so the removable element will not pass through. The cavity 210 in the planar surface of the blade 12 can accept a variety of removable elements. Example removable elements are various types of cheese or vegetable graters, food slicers, mandolin type slicers, food sieves, garlic presses, a blank plate, or various other kitchen tools. The orientation of these removable elements can be horizontal or vertical on the planar surface of the blade. A bottle opener may also be provided on a removable element or be integral to the blade 12. As referenced in FIG. 3A through FIG. 3J, the handle side 14 is formed so the blade extends down from the middle of the handle side in this embodiment. In other embodiments the handle portion 14 is formed so the blade 12 extends down one of the sides of the handle as referenced in FIG. 19A through FIG. 19T. FIG. 19A through FIG. 19J shows the removable element useable direction located on the same side of the handle portion overhang, while FIG. 19K through FIG. 19T shows the removable element useable direction located on the opposite side of the handle portion overhang. The removable elements can also be in different combinations, configurations, orientations, and sizes. The handle side 14 of the embodiments referenced in FIG. 3A through FIG. 3J, FIG. 9I through 9R, & FIG. 19A through FIG. 19T can be circular, square, rectangular, triangular, or various other shapes & sizes.

Figure 16A:
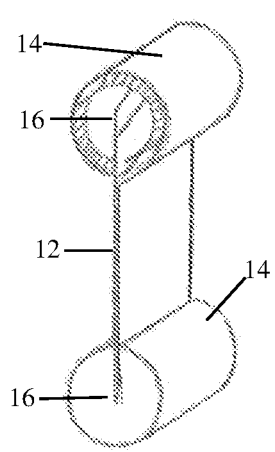
FIG. 16A. Is a side perspective view of two food cutters where the cutting side of each blade is stored in the handle side of the other food cutter.
Figure 16B:
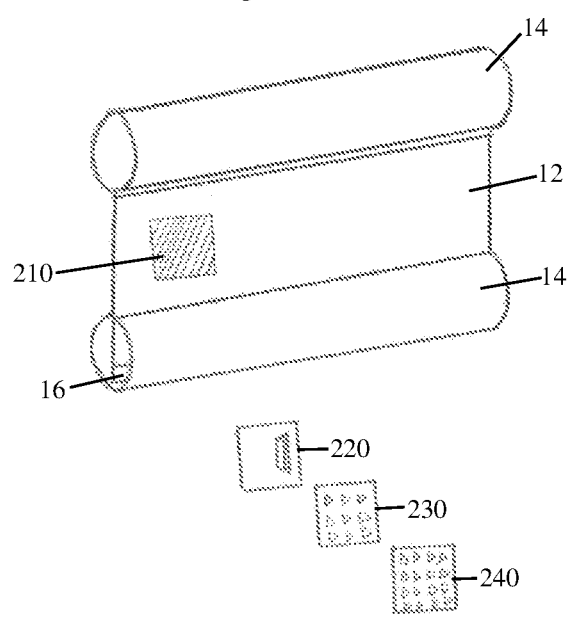
FIG. 16B. Is an isometric view of two food cutters where the cutting side of each blade is stored in the handle side of the other food cutter. There is a cavity in the planar surface of the blade in which to insert removable elements.
Figure 17:
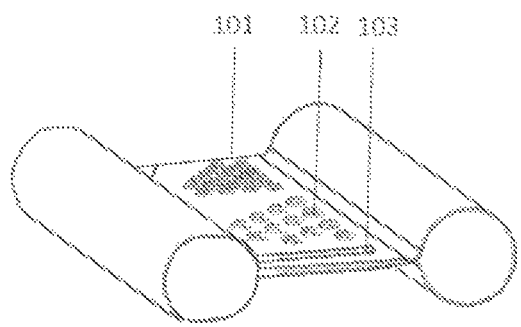
FIG. 17. Is an end angle isometric view of two food cutters where the cutting side of each blade is stored in the handle side of the other food cutter. There are integral kitchen tool elements in the planar surface of the cutter blade.
Figure 33A:
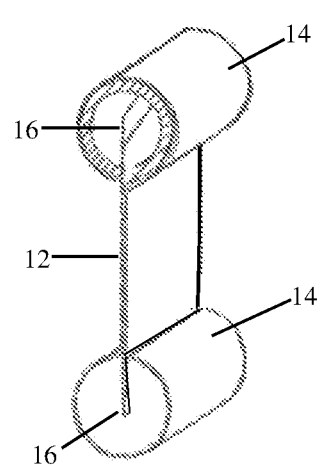
FIG. 33A. Is a side perspective view of two food cutters where the cutting side of each blade is stored in the handle side of the other food cutter.
Figure 33B:
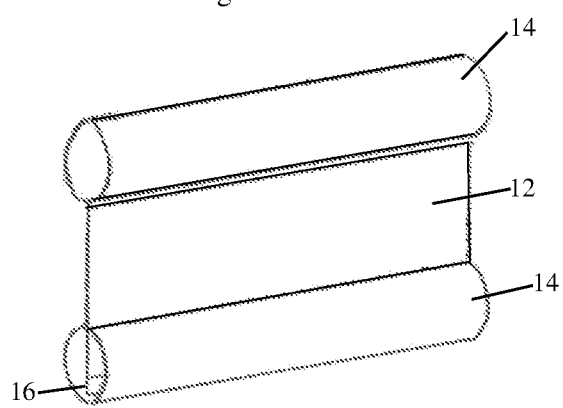
FIG. 33B. Is an isometric view of two food cutters where the cutting side of each blade is stored in the handle side of the other food cutter.

In another embodiment the food cutter can be configured so the cutting side of the blade is safely stored in the handle side of another food cutter as referenced in FIG. 33A & FIG. 33B. The handle side 14 of these cutters comprises a hollow channel and further comprises a slot sized to allow insertion of the cutting side 16 of the other cutter. The handle side 14 of these cutters can be formed integrally out of the same material, or fixedly attached and not formed integrally out of the same material. The embodiment referenced in FIG. 17 represents two food cutters stored with the cutting side of each cutter in the handle side of the other cutter. The embodiment referenced in FIG. 17 also has various kitchen tool elements integral to the blade surface. These elements can be located anywhere on the planar surface of the blade 12. These elements can also be in different combinations, configurations, orientations, and sizes. The cutting edge 16 of the blades can be angled or straight. In another embodiment referenced in FIG. 16B the food cutter has a cavity 210 in the blade 12 in which several interchangeable removable elements are configured to be inserted into said cavity 210. This cavity can be located anywhere on the planar surface of the blade 12. These removable elements can also be in different combinations, configurations, orientations, and sizes. The cutting edge 16 of the blade 12 can be angled or straight. The handle side 14 of the embodiments referenced in FIG. 33A, FIG. 33B, FIG. 17, & FIGS. 16A & B can be circular, square, rectangular, triangular, or various other shapes & sizes. In other embodiments the handle portion 14 is formed so the blade extends down one of the sides of the handle.

Figure 2:
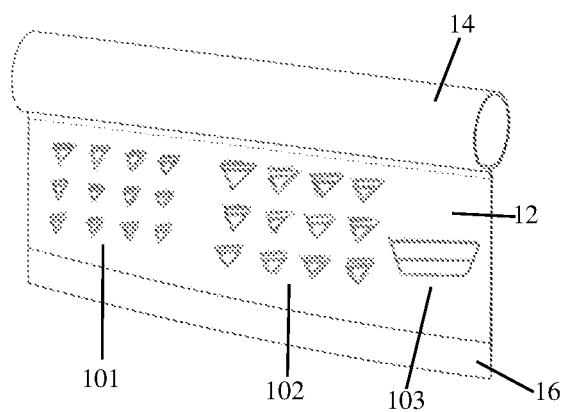
FIG. 2. Is an isometric view of another embodiment of a dough scraper type cutter with a small grater, a large grater, and a food slicer integrated into the planar surface of the blade and with a vertical element orientation.
Figure 3A:
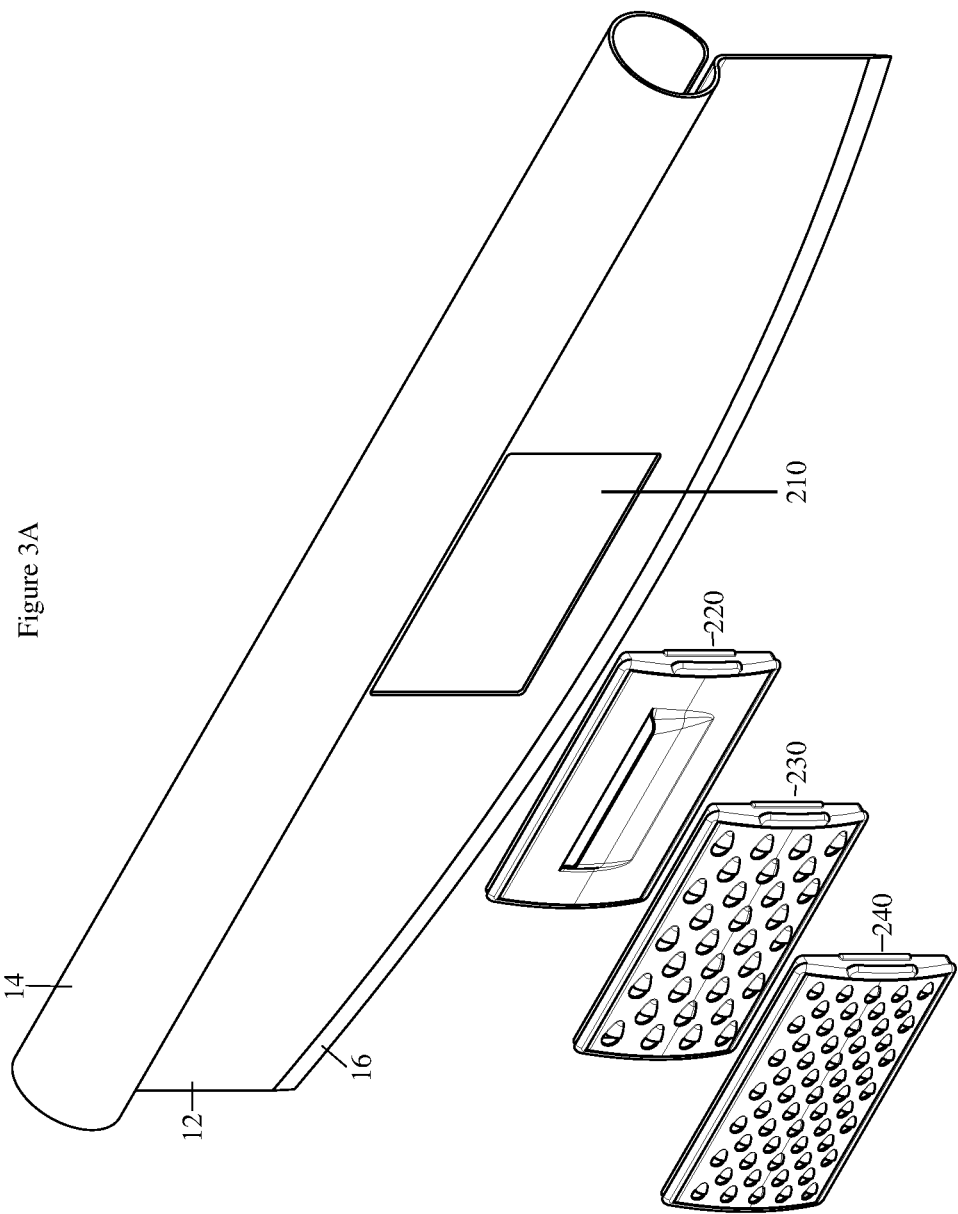
FIG. 3A. Is an isometric view of a first embodiment example of a food cutter with a cavity in the planar surface of the blade in which to insert removable elements.
Figure 20:
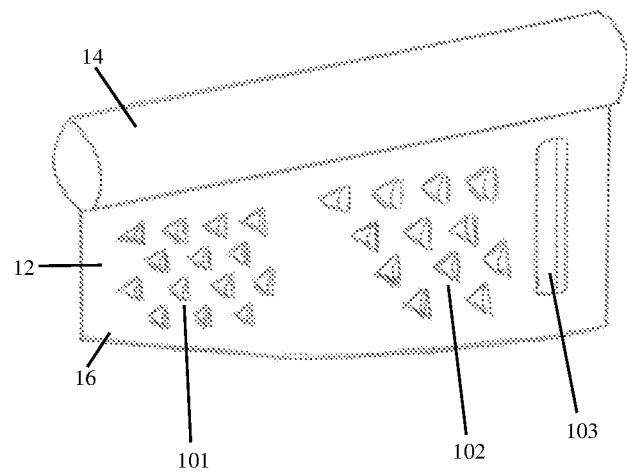
FIG. 20. Is an isometric view of a first embodiment example of a dough scraper type cutter with a small grater, a large grater, and a food slicer integrated into the planar surface of the blade. The blade has an angled cutting edge.
Figure 21:
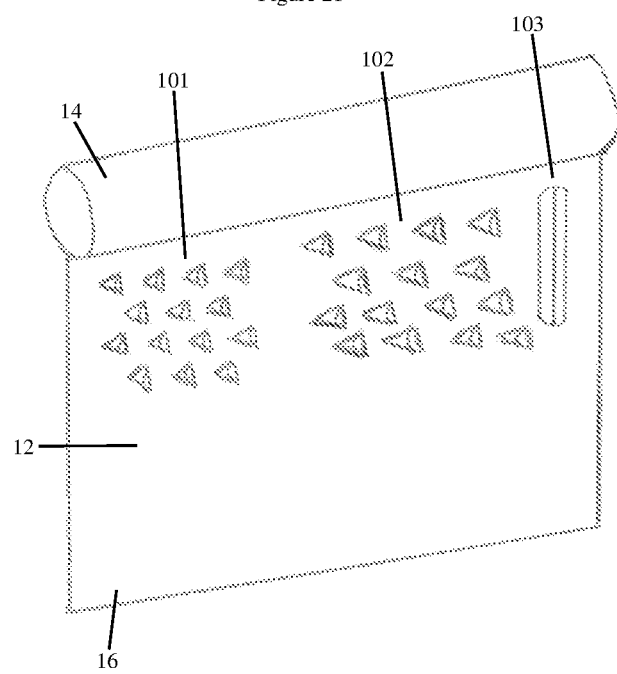
FIG. 21. Is an isometric view of a second embodiment example of a dough scraper type cutter with a small grater, a large grater, and a food slicer integrated into the planar surface of the blade. The blade has a straight cutting edge.
Figure 22:
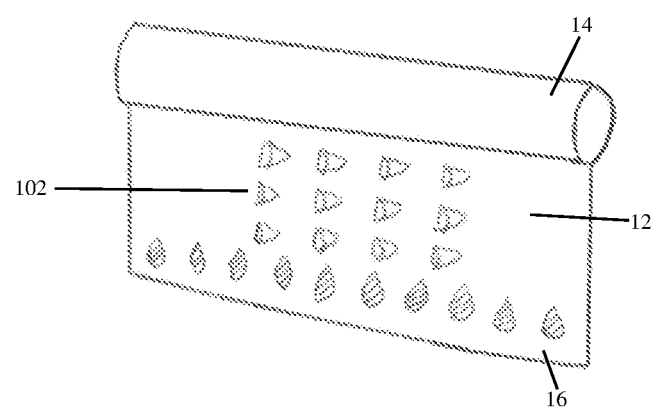
FIG. 22. Is an isometric view of a dough scraper type cutter with a Granton cutting edge.
Figure 23:
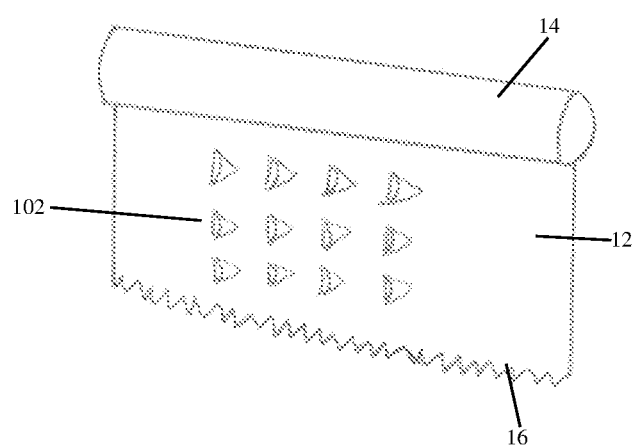
FIG. 23. Is an isometric view of a dough scraper type cutter with a serrated cutting edge.
Figure 24:
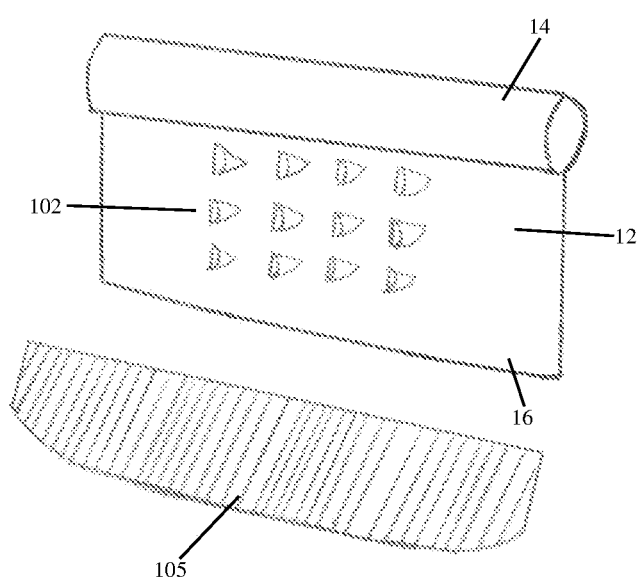
FIG. 24. Is an isometric view of a dough scraper type cutter with blade cover.
Figure 31A:
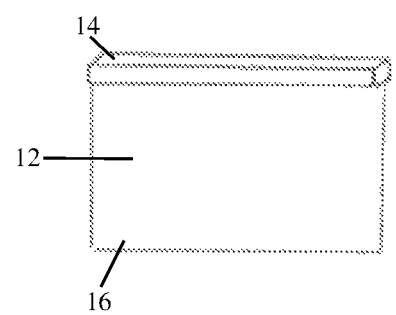
FIG. 31A. Is an isometric view of a dough scraper type cutter with a square shaped handle.
Figure 31B:
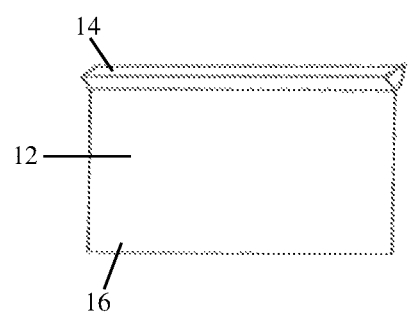
FIG. 31B. Is an isometric view of a dough scraper type cutter with a triangular shaped handle.
Figure 35:
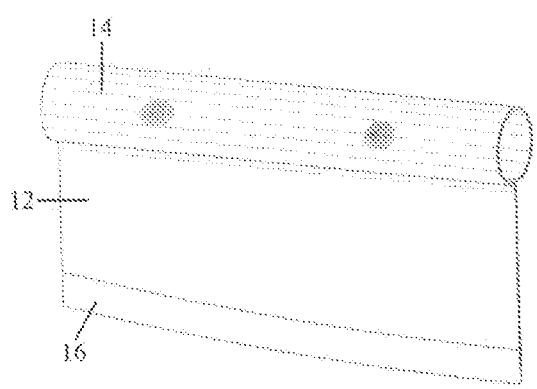
FIG. 35. Is an isometric view of a dough scraper type cutter in which the handle side of the knife is fixedly attached to the blade and not formed integrally out of the same material.
Figure 50:
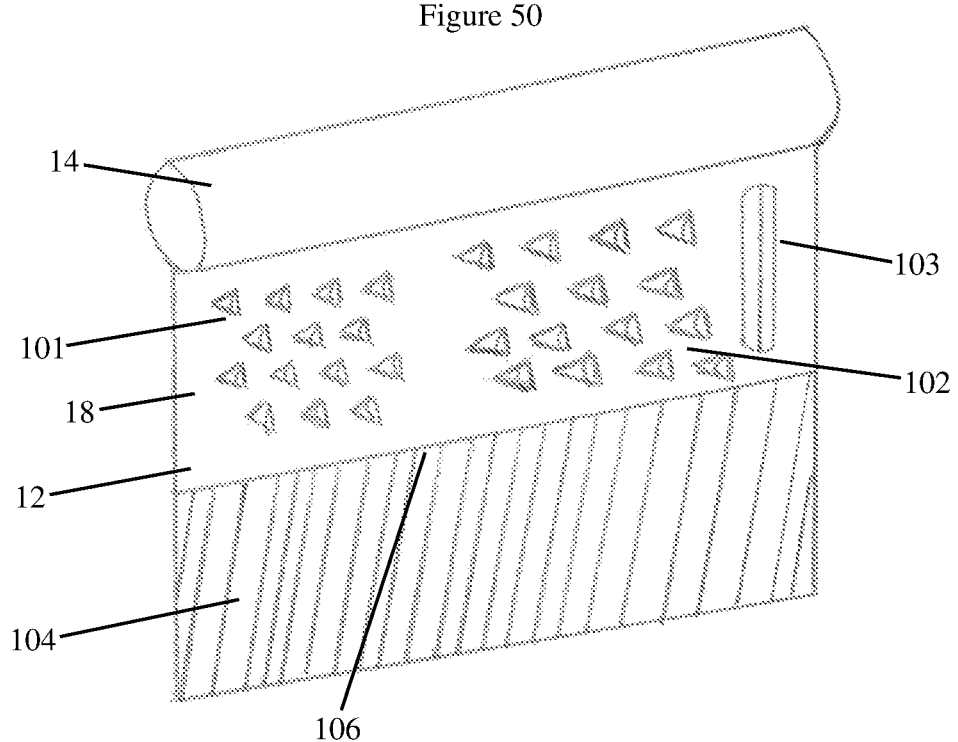
FIG. 50. Is an isometric view of a food cutter with a small grater, a large grater, and a slicer integrated into the planar surface of the blade. The blade cover is attached to provide protection against the blade bottom cutting edge while utilizing the graters and slicer. The bottom cutting edge of the blade is linear in this embodiment.

FIG. 20 is an isometric view of a dough scraper type cutter with different sized graters and slicers integrated into the planar surface of the blade 12. In FIG. 20, element 101 demonstrates a small opening food grater, element 102 demonstrates a large opening food grater, and element 103 demonstrates a food slicer. These elements can be located anywhere on the planar surface of the blade 12. These elements can also be in different combinations, configurations, orientations, and sizes, or only have one of these elements integrated into the planar surface of the blade 12. FIG. 2 demonstrates a dough scraper type cutter with the integral elements in a vertical orientation. In this embodiment the graters & slicer are stamped into the metal. In other embodiments the elements are attached by welding, or other means of connection such as rivets, screws, glue, and various other connection methods or combinations thereof. In this embodiment the blade 12 of the dough scraper type cutter is stainless steel, but in other embodiments the blade is comprised of food grade material in a group consisting of food grade metal, plastic, silicone, rubber, carbon fiber, ceramic, wood, or a combination thereof. The cutting side 16 of the blade 12 has a sharpened edge in this embodiment and extends along substantially the entirety of the bottom portion of the blade 12. In this embodiment, the cutting side 16 of the blade has an angled edge to provide a cut with a simple downward motion of the knife. In other embodiments, the cutting side may be straight as referenced in FIG. 21 and blunt for uses such as in processing dough. In other embodiments the blade 12 further comprises a Granton edge as referenced in FIG. 22 or a serrated edge as referenced in FIG. 23. In other embodiments the dough scraper type cutter has a cover 105 to conceal the cutting side 16 of the blade as referenced in FIG. 24. This blade cover 105 is comprised of food grade material in a group consisting of food grade metal, plastic, silicone, rubber, carbon fiber, ceramic, wood, or a combination thereof. FIG. 50 demonstrates another embodiment of a dough scraper type cutter where the blade cover 104 is attached while the small grater 101, large grater 102, and slicer 103 are still exposed. The blade cover 104 protects the user from the bottom cutting edge of the blade while utilizing the various kitchen tool elements on the blade portion 12. The handle portion 14 and the top edge 106 of the blade cover 104 also act as guides for food items on either side of a channel 18 while utilizing the kitchen tool elements on the blade portion 12 in a horizontal orientation. This blade cover 104 is comprised of food grade material in a group consisting of food grade metal, plastic, silicone, rubber, carbon fiber, ceramic, wood, or a combination thereof. FIG. 25 is an isometric view of a dough scraper type cutter 200 with a removable food slicer 220 and an opening which serves as a bottle opener 280. FIG. 26 is an isometric view of a dough scraper type cutter with several interchangeable removable elements configured to be insertable into a cavity on the planar surface of the blade 12. Example removable elements include a food slicer 220, a large opening grater 230, and a small opening grater 240 FIG. 27 is a rear perspective view of the dough scraper type cutter 200 referenced in FIG. 25 showing the integral bottle opener 280, and cavity 210 which is used to insert removable elements. In this example, each of the removable elements has a peripheral ridge that snaps into the cavity 210. In other embodiments the removable elements can attach by various other mating connections or configurations. Some possible embodiments of other mating configurations include a gasket type connection where a shaped piece or ring made of flexible material such as rubber inserts into the cavity and then enlarges when it is on the other side of the cavity, securing the removable element to the blade cavity. In this embodiment the removable element has an overhang or frame that will not fit through the cavity, so the removable element will not pass through. Another mating configuration embodiment includes the removable elements having male snaps that are flexible and made from a material such as plastic or metal. The male snaps fit through the blade cavity and then snap back to secure the removable element once the snaps are on the other side of the blade cavity. The removable element has an overhang or frame that will not fit through the cavity, so the removable element will not pass through. In this embodiment the cavity 210 in the planar surface of the blade can accept a variety of removable elements. Example removable elements are various types of cheese or vegetable graters, food slicers, mandolin type slicers, food sieves, garlic presses, a blank plate, or various other kitchen tools. A bottle opener may also be provided on a removable element rather than being integral to the blade. FIG. 28A is a front view of the dough scraper type cutter 200 of FIG. 25. FIG. 28B is a detailed view of the bottle opener 280. FIG. 29A is a front view of a dough scraper type cutter 201 with a bottle opener 290 provided in the outside edge of the blade. FIG. 29B is a detailed view of the bottle opener 290. In another embodiment referenced in FIG. 30 the dough scraper type cutter 200 has a straight cutting edge 16 and a cavity 210 in the planar surface of the blade 12 that can accept a variety of removable elements. In other embodiments, the handle side 14 of the dough scraper type cutter is square as referenced in FIG. 31A, or a triangular shape as referenced in FIG. 31B. In other embodiments the handle side 14 of the dough scraper type cutter is fixedly attached to the blade and not formed integrally out of the same material as referenced in FIG. 35. The handle side 14 in these embodiments can be solid or hollow and of various shapes & sizes.

Figure 36:
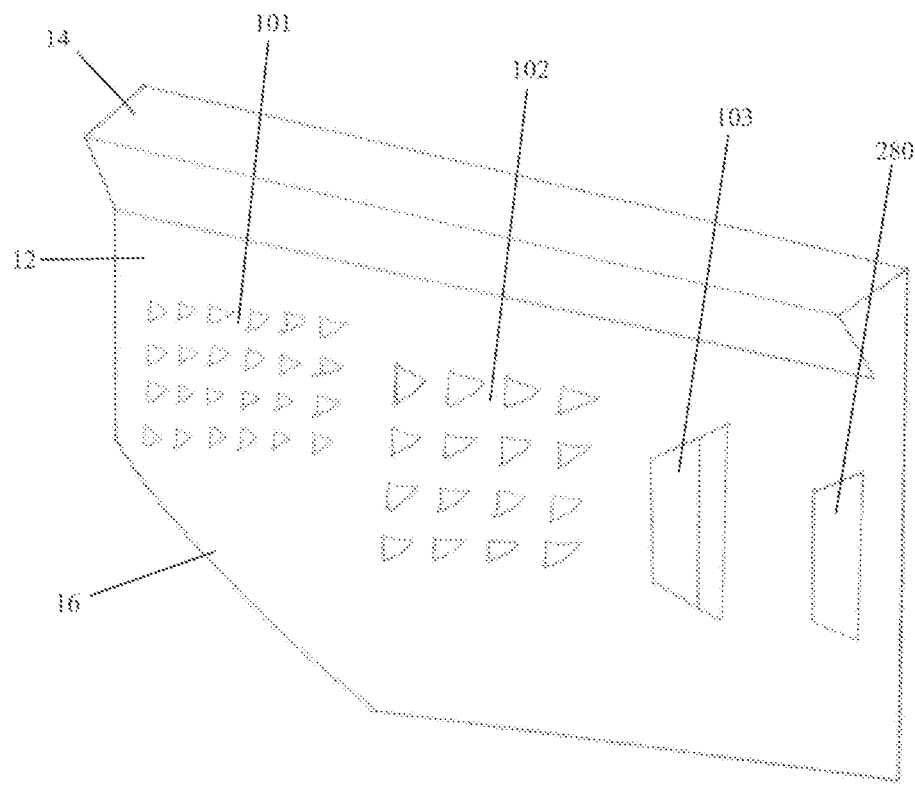
FIG. 36. Is an isometric view of a dough scraper type cutter with an integral handle and blade which extends down one of the handle sides. In this embodiment there are integral kitchen tool elements in the planar surface of the blade and the blade has an angled cutting edge.
Figure 37:
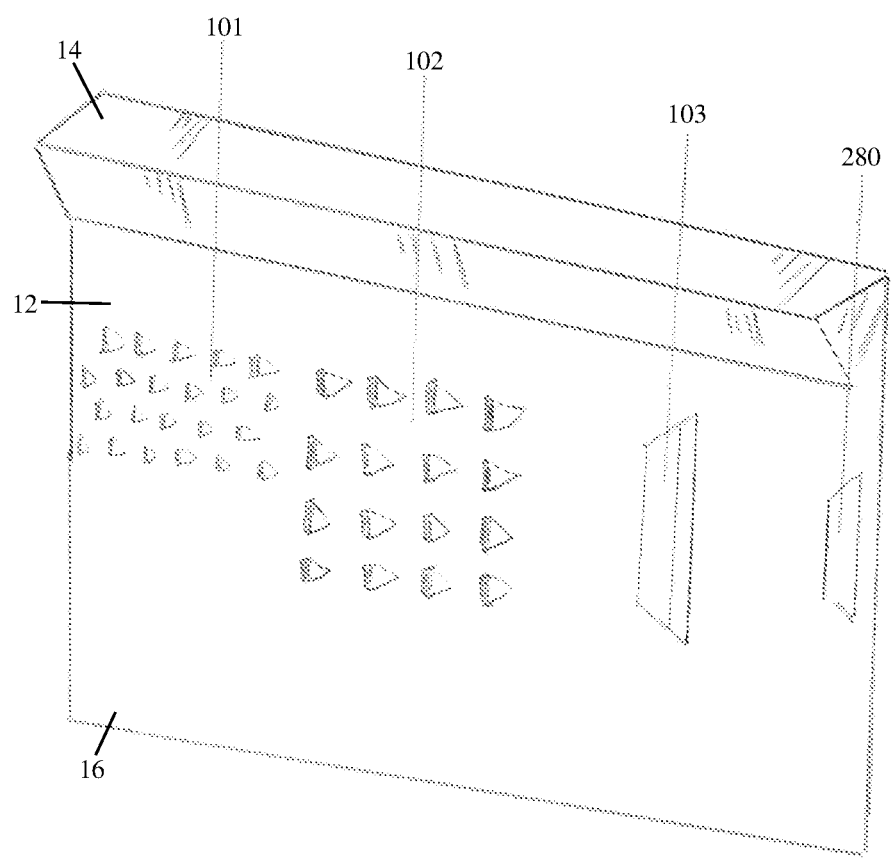
FIG. 37. Is an isometric view of a dough scraper type cutter with an integral handle and blade which extends down one of the handle sides. In this embodiment there are integral kitchen tool elements in the planar surface of the blade and the blade has a straight cutting edge.
Figure 38:
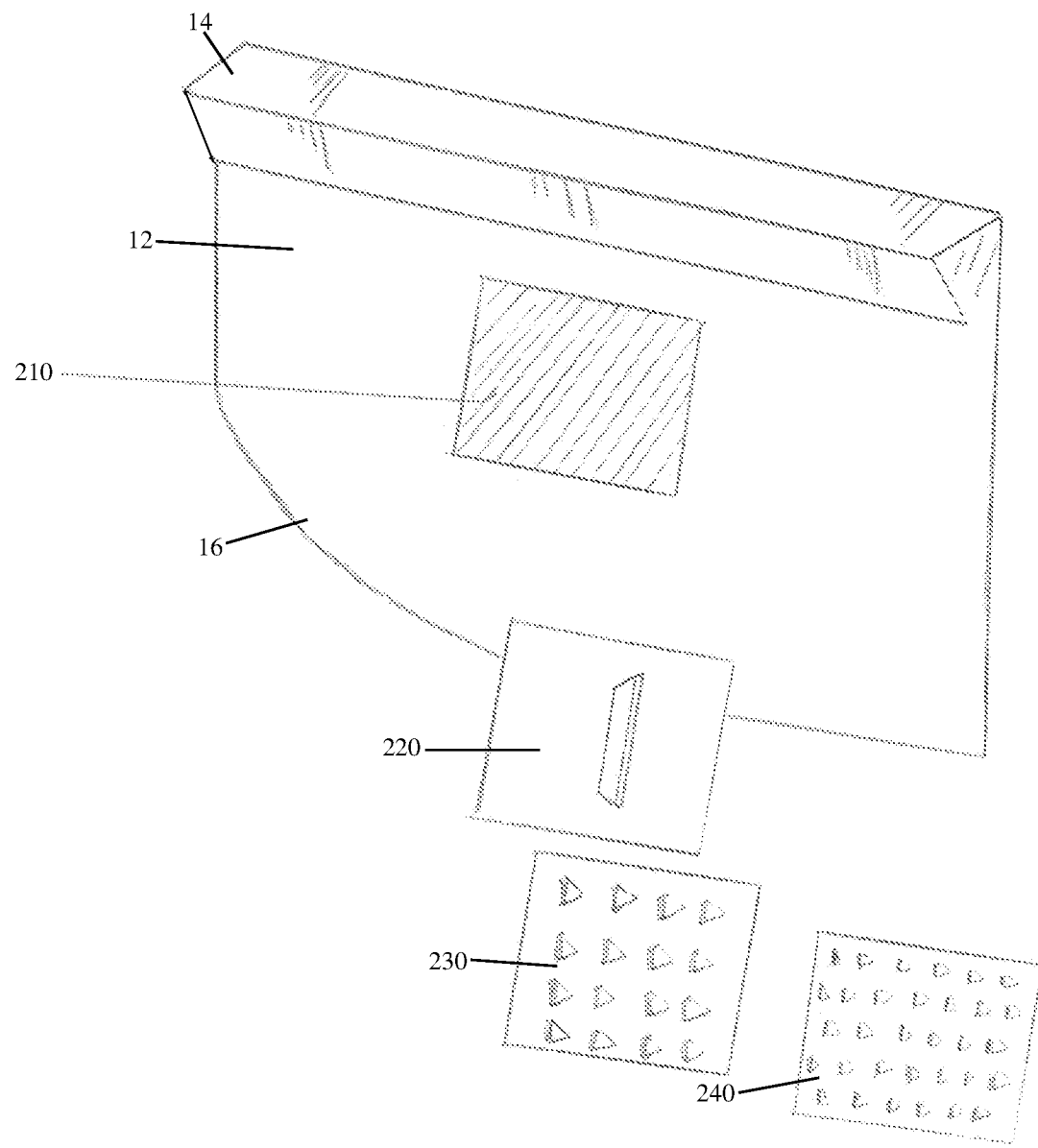
FIG. 38. Is an isometric view of a dough scraper type cutter with an integral handle and blade which extends down one of the handle sides. In this embodiment there is a cavity in the planar surface of the blade in which to insert removable elements and the blade has an angled cutting edge.
Figure 39:
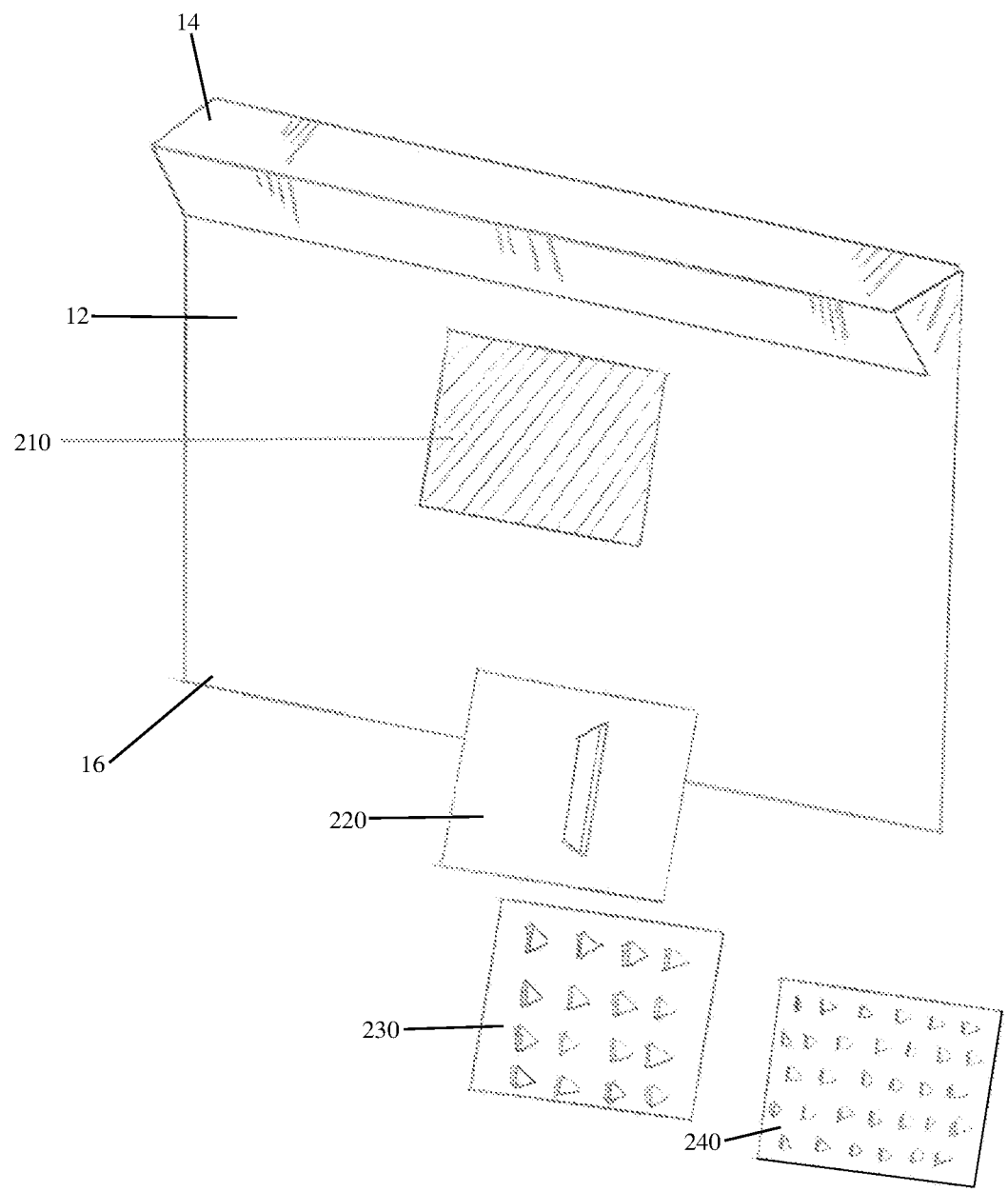
FIG. 39. Is an isometric view of a dough scraper type cutter with an integral handle and blade which extends down one of the handle sides. In this embodiment there is a cavity in the planar surface of the blade in which to insert removable elements and the blade has a straight cutting edge.

In other embodiments the handle portion 14 is formed so the blade 12 extends down one of the sides of the handle 14 as referenced in FIG. 36. The embodiment referenced in FIG. 36 has various elements integral to the blade surface. In FIG. 36, element 101 demonstrates a small opening food grater, element 102 demonstrates a large opening food grater, element 103 demonstrates a food slicer, and element 280 demonstrates a bottle opener. These elements can be located anywhere on the planar surface of the blade 12. These elements can also be in different combinations, configurations, orientations, and sizes. The cutting edge 16 can be angled as referenced in FIG. 36 or straight as referenced in FIG. 37. In another embodiment referenced in FIG. 38 the dough scraper type cutter has a cavity 210 in which several interchangeable removable elements are configured to be inserted into said cavity 210. This cavity 210 can be located anywhere on the planar surface of the blade 12. These removable elements can also be in different combinations, configurations, orientations, and sizes. The cutting edge 16 can be angled as referenced in FIG. 38 or straight as referenced in FIG. 39. The handle side of the embodiments referenced in FIG. 36, FIG. 37, FIG. 38, & FIG. 39 can be circular, square, rectangular, triangular, or various other shapes & sizes.

Figure 34A:
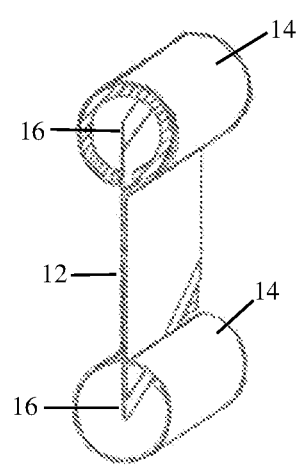
FIG. 34A. Is a side perspective view of two dough scraper type cutters where the cutting side of each blade is stored in the handle side of the other dough scraper type cutter.
Figure 34B:
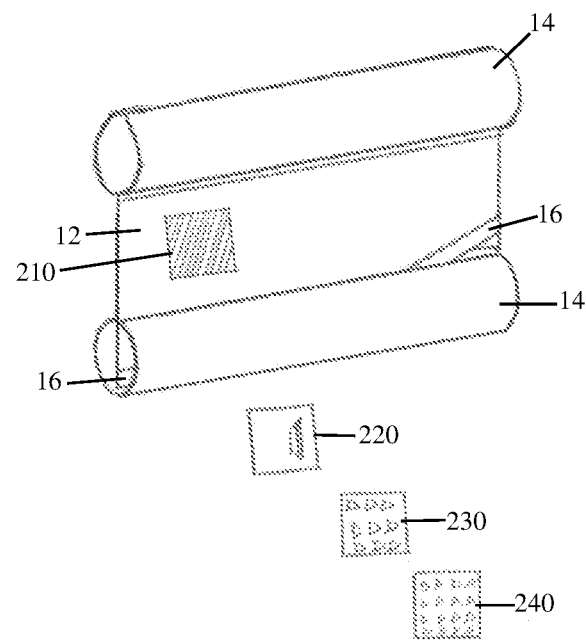
FIG. 34B. Is an isometric view of two dough scraper type cutters where the cutting side of each blade is stored in the handle side of the other dough scraper type cutter. There is a cavity in the planar surface of the blade in which to insert removable elements.
Figure 40A:
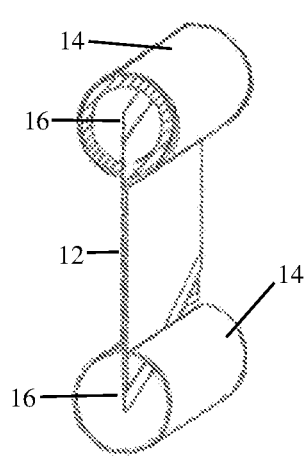
FIG. 40A. Is a side perspective view of two dough scraper type cutters where the cutting side of each blade is stored in the handle side of the other dough scraper type cutter.
Figure 40B:
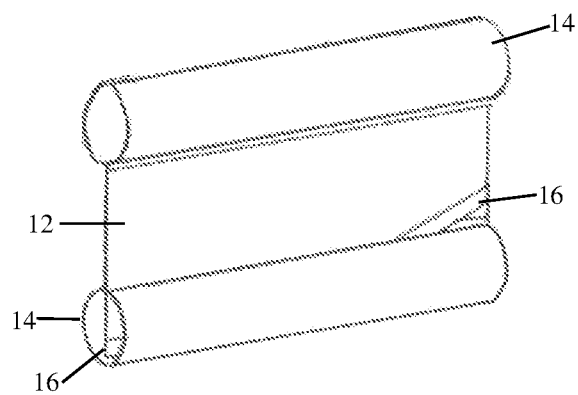
FIG. 40B. Is an isometric view of two dough scraper type cutters where the cutting side of each blade is stored in the handle side of the other dough scraper type cutter.
Figure 41:
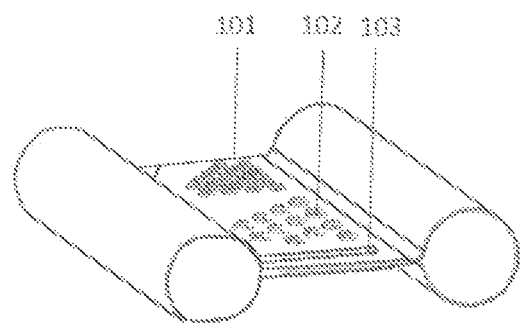
FIG. 41. Is an end angle isometric view of two dough scraper type cutters where the cutting side of each blade is stored in the handle side of the other dough scraper type cutter. There are integral kitchen tool elements in the planar surface of the cutter blade.

In another embodiment the dough scraper type cutter can be configured so the cutting side 16 of the blade is safely stored in the handle side 14 of another dough scraper type cutter as referenced in FIG. 40A& FIG. 40B. The handle side 14 of these cutters comprises a hollow channel and further comprises a slot sized to allow insertion of the cutting side 16 of the other cutter. The handle side 14 of these cutters can be formed integrally out of the same material, or fixedly attached and not formed integrally out of the same material. The embodiment referenced in FIG. 41 represents two dough scraper type cutters stored with the cutting side of each cutter in the handle side of the other cutter. The embodiment referenced in FIG. 41 also has various kitchen tool elements integral to the blade surface. These elements can be located anywhere on the planar surface of the blade. These elements can also be in different combinations, configurations, orientations, and sizes. The cutting edge can be angled or straight. In another embodiment referenced in FIG. 34B the dough scraper type cutter has a cavity 210 in which several interchangeable removable elements are configured to be inserted into said cavity 210. These elements can be located anywhere on the planar surface of the blade 12. These elements can also be in different combinations, configurations, orientations, and sizes. The cutting edge 16 can be angled or straight. The handle side of the embodiments referenced in FIG. 40A, FIG. 40B, FIG. 41, FIG. 34A, & FIG. 34B can be circular, square, rectangular, triangular, or various other shapes & sizes. In other embodiments the handle portion is formed so the blade extends down one of the sides of the handle.

It will be understood that certain features and sub-combinations are of utility and may be employed without reference to other features and sub-combinations. Since many possible embodiments may be made of the invention without departing from the scope thereof, it is to be understood that all matter herein set forth or shown in the accompanying drawings is to be interpreted as illustrative and not in a limiting sense.

What is claimed is:

1. A food cutter apparatus having a blade portion and a handle portion, both portions made of rigid material, the food cutter apparatus comprising:
    a blade portion comprising:
        a substantially planar front side,
        a convex bottom cutting edge,
        a left side edge,
        a right side edge, and
        a substantially planar back side opposite of the front side,
        the planar front side and back side of the blade portion defining a blade thickness and comprising a first kitchen tool element, such that the first kitchen tool element is selected from the group comprising a grater, zester, slicer, sieve, garlic press, bottle opener, or combination thereof; and
    a handle portion opposite to the bottom cutting edge of the blade portion and spaced apart from the convex bottom cutting edge
    of the blade portion, the handle portion of the food cutter apparatus comprising:
        a grip portion with a thickness greater than the blade portion thickness, and
        a handle portion straight bottom edge; and
    a blade cover, removably attachable to the convex bottom cutting edge, the blade cover comprising
        a protective shield configured to cover the convex bottom cutting edge of the blade portion from the left edge to the right edge while utilizing the first kitchen tool element; and
        a straight top edge configured to be opposed to and substantially parallel to the handle portion straight bottom edge, and to leave at least a portion of the first kitchen tool element exposed therebetween, and to provide a channel between the blade cover straight top edge and the handle portion straight bottom edge for food items while utilizing the first kitchen tool element in a horizontal orientation.

2. The food cutter apparatus of claim 1 wherein the handle portion is comprised of a separate rigid material than the blade portion.

3. The food cutter apparatus of claim 1 wherein the handle portion is formed integrally from the same rigid material as the blade portion.

4. The food cutter apparatus of claim 1 wherein the handle portion functions as a guide for food products while utilizing the first kitchen tool element.

5. The food cutter apparatus of claim 1 wherein the handle portion functions as a protruding shield for the first kitchen tool element while in storage.

6. The food cutter apparatus of claim 1 wherein the blade portion comprises at least two kitchen tool elements.

7. The food cutter apparatus of claim 1 wherein the channel is configured as a guide for food products while utilizing the first kitchen tool element.

8. The food cutter apparatus of claim 7 wherein the channel is configured as a guide for food products while utilizing the first kitchen tool element in a horizontal orientation.

9. The food cutter apparatus of claim 1 wherein the blade portion comprises a single rigid material.

* * * * *